United States Patent [19]

Koplow et al.

[11] 3,913,721

[45] Oct. 21, 1975

[54] SINGLE TAPE EDITING

[75] Inventors: Harold Stanley Koplow, Peabody; Fritz Eberle, Lowell; Shu-Kuang Ho, Chelmsford; Edward Lesnick, Carlisle, all of Mass.

[73] Assignee: Wang Laboratories, Inc., Tewksbury, Mass.

[22] Filed: Oct. 9, 1973

[21] Appl. No.: 404,692

[52] U.S. Cl. .......... 197/19; 340/172.5

[51] Int. Cl.² .......... B41J 5/30

[58] Field of Search ....... 197/19, 84, 20; 340/172.5, 340/147.1, 146.1, 174.1; 179/100.2 B; 235/167

[56] References Cited

UNITED STATES PATENTS

| | | | |
|---|---|---|---|
| 3,260,340 | 7/1966 | Locklar et al. | 197/19 |
| 3,297,124 | 1/1967 | Sims | 197/19 |
| 3,298,007 | 1/1967 | MacDonald et al. | 340/147.1 |
| 3,299,408 | 1/1967 | An Wang et al. | 340/172.5 |
| 3,434,130 | 3/1969 | Lemelson | 340/174.1 |
| 3,579,193 | 5/1971 | Bernier | 340/172.5 |
| 3,674,125 | 7/1972 | Kolpek | 197/19 |

*Primary Examiner*—J. Reed Fisher
*Assistant Examiner*—R. T. Rader

[57] ABSTRACT

An editing typewriter system using a record medium includes record mode signal means providing a record mode signal, edit mode signal means providing an edit mode signal, and control logic. The control logic includes means responsive to the record mode signal to record onto a record medium a position signal and a first set of data signals in precise relationship, means responsive to the edit mode signal to read a previously recorded position signal from the record medium, and means responsive to the edit mode signal and to the reading of the previously recorded position signal to record onto the record medium a replacement set of data signals superimposed on the first set of data signals; the previously recorded position signal and the replacement set of data signals are recorded on the record medium in precise relationship.

9 Claims, 16 Drawing Figures

TAPE WRITE ROUTINE

SINGLE TAPE EDITING

This invention relates to editing typewriter systems.

Editing typewriter systems are generally employed when it is desired to prepare edited text by typing a preliminary draft of a document, using a typewriter keyboard, storing this draft in some record medium, correcting the stored draft by suitable editing, and using the edited stored draft to cause the typewriter system to type out the edited material in final form. Such a record medium may be, for example, punched paper tape, magnetic tape, or magnetic cards. A typical system is described in our patent application, Ser. No. 298,664, filed Oct. 18, 1972.

Major alterations in such text are conveniently accomplished by transferring from a first record medium to a second such medium the portions of the text that do not require change. The operator stops the transfer operation as necessary to insert altered portions or to delete portions appearing in the first record medium. This editing process is referred to as a "Transfer" mode of editing. In this mode of editing, all material recorded on the second record medium is written onto it serially, without reversing the direction in which the medium is driven. When editing is accomplished in this way, each block or other unit of information on the second record medium is reliably and accurately spaced with respect to the preceding and succeeding blocks. In the absence of mechanical malfunction, errors caused by overlapping blocks do not occur.

This method of revision, although time-consuming, is satisfactory for major changes in the text, but becomes cumbersome and inconvenient when only minor changes are required. Thus if a single word is to be altered in the text of a long document, the operator can transfer the entire document to a second record medium, correcting the one word, before causing the typewriter system to type out the recorded document in final form; or alternatively the operator can cause the machine to type out in final form the text up to that word, stop, insert the correct word, skip the erroneous word, and continue. The latter operation, while it appears simple and time-saving, because particularly inconvenient if the document is to be typed out from the record medium many times. As another example, it frequently occurs that a typist glances back over the typed lines on the draft sheet (already recorded on the record medium) and observes an error, which it is by then too late to correct simply.

It is therefore desirable to provide an editing typewriter system with the capability of making these relatively minor editing operations within a single record medium, without the necessity of transferring all correct portions of the document to a second record medium.

This type of single record medium editing, however, entails the necessity of precisely locating on the record medium the physical position of the portion of text to be edited. Thus in order to record a correctly spelled word over the incorrect word, the word must be located with precision and the new word must be recorded in place with equal precision; if this is not done, portions of the recorded information on either side of the alteration may be damaged or lost and the entire record made useless.

When the record medium is a magnetic card, the physical location of each information unit, generally a letter of the alphabet, is precisely determined by the card format, and such minor alterations are easily made. However, magnetic cards do not serve satisfactorily for the storage and editing process of long documents such as manuals, extensive reports, legal briefs and patent applications. Alternatively, the record medium may be a preformatted cartridge tape, for example a tape using one track of two available tracks for timing information, leaving only one track available for recording data. Such a method requires a relatively large amount (footage) of tape for recording data. More importantly, over a long period of use, the timing signals on such preformatted tape decreases in intensity, while noise increases, and the tapes thus become increasingly less reliable. Further, such cartridge tapes are not convenient, because of their large size, for the storage of short documents such as brief letters and memoranda. In addition, such cartridge tapes are generally not easily removed and interchanged.

Magnetic tape cassettes are a convenient record medium for the storage of both long and short documents but systems employing such magnetic tape cassettes have required all editing to be accomplished in the Transfer mode. There have been several reasons for this limitation.

It has been found in practice that if the tape drive is reversed and the tape is backed up to position the recording head in the gap between two recorded blocks of data, the position of the recording head is determined only to a limited degree of accuracy. This imprecision in locating the recording head may be caused, for example, by making the correction using a different tape drive from the one employed in the original recording. However, even when the same tape drive is used, some error is likely to be caused by the fact that when the tape drive motor is turned off, the tape must coast to a stop, stopping after a small but finite time interval that may vary from one occasion to another. Similarly when the motor is turned on, the tape comes up to speed over a small but finite time interval that may also vary from one occasion to the next.

Under the conditions just described, rerecording of successive data blocks produces sufficient discrepancy in position between the original and the replacement blocks to damage one or more of the previously recorded blocks, causing errors in tape reading because the damaged block cannot be satisfactorily interpreted. The entire recorded document is then useless.

It is therefore an object of this invention to provide an editing typewriter system employing a non-preformatted record medium that permits correction within a single record medium by providing means accurately to position each replacement block with respect to the block being replaced. It is a further object of this invention to provide such capability while requiring the use of relatively little additional space on the record medium, thus making efficient use of the record medium. Another object is to provide an editing typewriter system, employing magnetic tape cassettes as the record medium, that provides alternative modes of editing stored material, either by the Transfer mode of editing or by editing within a single record medium.

These and other objects of the invention are accomplished by providing an editing typewriter system comprising a keyboard with a plurality of symbol printing keys providing alpha-numeric printing signals, record mode signal means providing a record mode signal, and edit mode signal means providing an edit mode signal. The system further comprises type means having a plurality of alpha-numeric printing symbols corresponding to the symbol printing keys, the type means being operable in response to the printing signals to print selected symbols in a line; control logic conected to the keyboard means and including temporary storage means for storing the printing signals; and a record unit connected to the control logic and comprising drive means responsive to the control logic for moving a record medium in forward and reverse directions, recording means responsive to the control logic for recording signals on a record medium from the temporary storage medium, and reading means responsive to the control logic for reading signals from a record medium into the temporary storage means.

The control logic includes means responsive to the record mode signal to operate the drive means and the recording means to record onto the record medium a position signal and a first set of data signals in precise relationship, the first set of data signals providing a line of printing signals; the control logic further includes means responsive to the edit mode signal to operate the drive means and the reading means to read a previously recorded position signal from the record medium, and means responsive to the edit mode signal and the reading of the previously recorded position signal while the drive means continues to be operated to operate the recording means to record onto the record medium a replacement set of signals to provide a replacement line of printing signals, superimposed on the first set of data signals. The previously recorded position signal and the replacement set of data signals are recorded on the record medium in precise relationship.

In another aspect of the invention, the typewriter system keyboard further has line selection signal means providing a line selection signal, and the control logic further includes record medium backup indicator means, means responsive to the line selection signal to operate the drive means and the reading means to select and read a recorded line of printing signals into the temporary storage means, and means responsive to the completion of the reading to set the record medium backup indicator means to a first value. The control logic further includes means responsive to the edit mode signal and the symbol printing keys to alter the line of printing signals in the temporary storage means to provide a replacement line, and means responsive to the edit mode signal and the record medium backup indicator means first value to operate the drive means to move the record medium in the reverse direction and to position the recording and reading means in advance of the recorded line of printing signals and in advance of the previously recorded position signal immediately preceding the recorded line, before operating the drive means and the reading and recording means to read the position signal and to record the replacement line onto the record medium. There is further included in the control logic means responsive to completion of recording of any set of signals providing a line to set the record medium backup indicator means to a second value, and means responsive to the edit mode signal and the record medium backup indicator means second value continuously to operate the drive means to move the record medium in the forward direction and to operate the reading means to read the next succeeding position signal and in response to the reading of the next succeeding position signal to operate the recording means to record a replacement line onto the record medium.

In still another aspect of the invention, there is provided an editing typewriter system selectively operable to provide an edited record in a first mode employing two record mediums and a second mode employing a single record medium. The system comprises a keyboard with a plurality of symbol printing keys providing alpha-numeric printing signals, a record mode signal means providing a record mode signal, edit mode signal means providing an edit mode signal, and transfer mode signal means providing a transfer mode signal; type means having a plurality of alpha-numeric printing symbols corresponding to the symbol printing keys, the type means being operable in response to the printing signals to print selected symbols in a line; control logic connected to the keyboard means and including temporary storage means for storing the printing signals; and a record unit for receiving two record mediums.

The record unit is connected to the control logic and comprises drive means responsive to the control logic for moving at least one record medium in forward and reverse directions, recording means responsive to the control logic for recording signals on a record medium from the temporary storage means, and reading means responsive to the control logic for reading signals from a record medium into the temporary storage means. The control logic includes means responsive to the record mode signal to operate the drive means and recording means to record onto a record medium a position signal and a first set of data signals in precise relationship, the first set of data signals providing a line of printing signals; the control logic further includes means responsive to the edit mode signal to operate the drive means and reading means to read a previously recorded position signal from a record medium, and means responsive to the edit mode signal and the reading of the previously recorded position signal while the drive means continues to be operated to operate the recording means to record onto that record medium a replacement set of signals to provide a replacement line of printing signals, superimposed on the first set of data signals. The previously recorded position signal and the replacement set of data signals are recorded on the record medium in precise relationship. The control means further includes means responsive to the transfer mode signal to operate the drive means, reading means and recording means to read a set of data signals from a first record medium and to record on to the second record medium a position signal and the set of data signals in precise relationship.

Other objects, features and advantages will appear from the following description of a preferred embodiment of the invention, taken together with the attached drawings thereof, in which:

BRIEF DESCRIPTION OF THE DRAWINGS

FIG. 13, 14 and 5 show schematically the operations of reading and recording on the record medium.

DESCRIPTION OF THE PREFERRED EMBODIMENT

General Description
Operational Features
Codes
Control Logic
Memory and Buffer
Power Turned on
Storage of Typed Characteristics:Underlining

GENERAL DESCRIPTION

Figure 1:
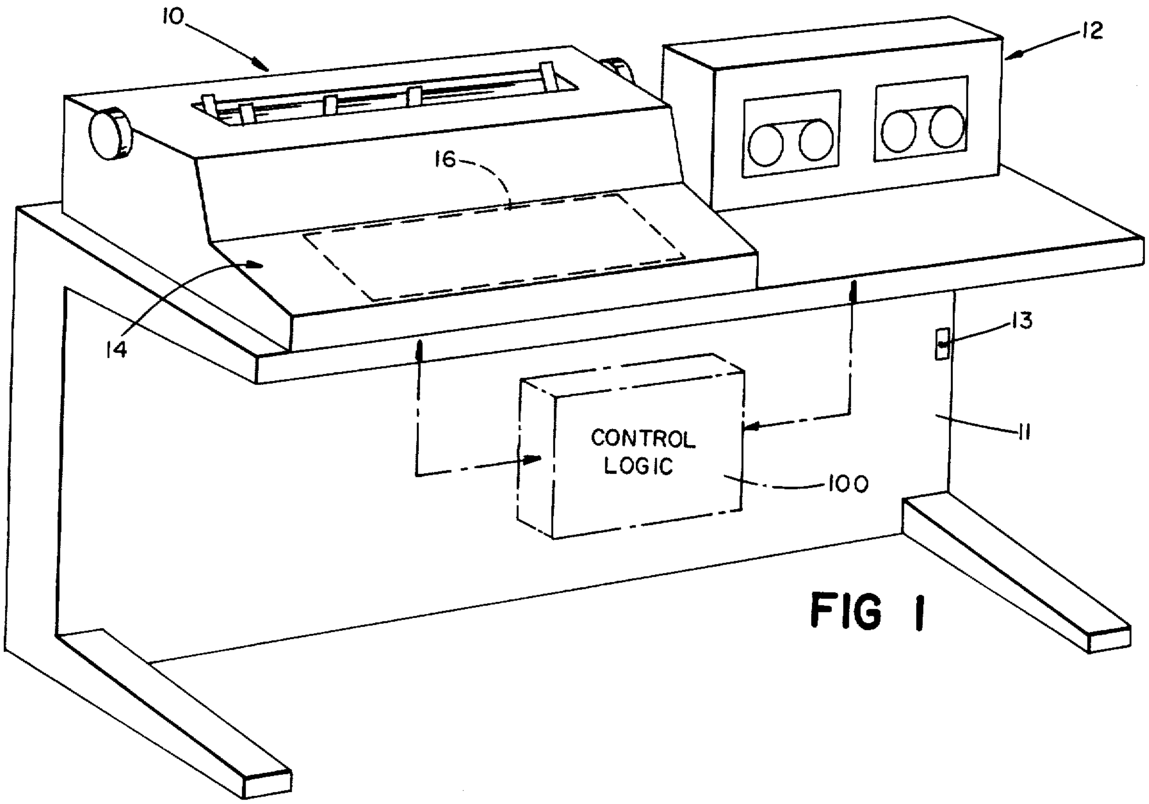
FIG. 1 is an external view of the editing typewriter system of the invention.
Figure 2:
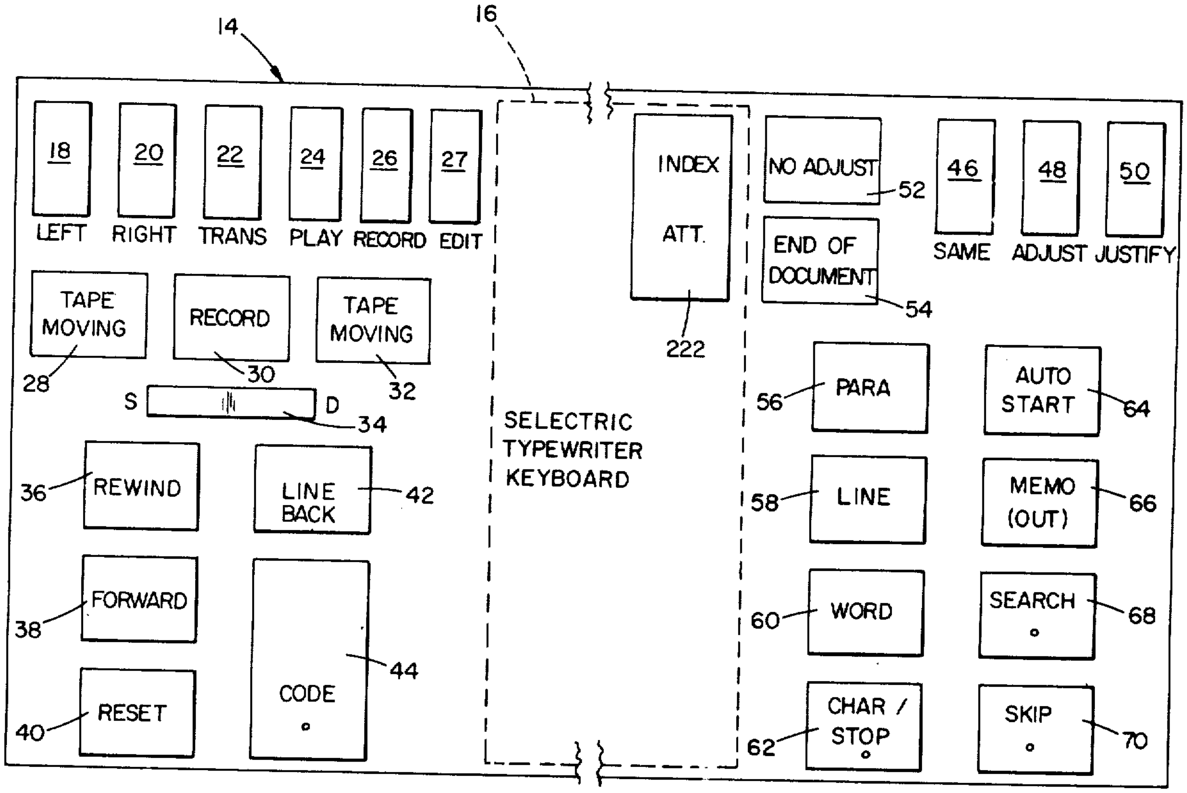
FIG. 2 shows the keyboard of the editing typewriter system of FIG. 1.
Figure 3:
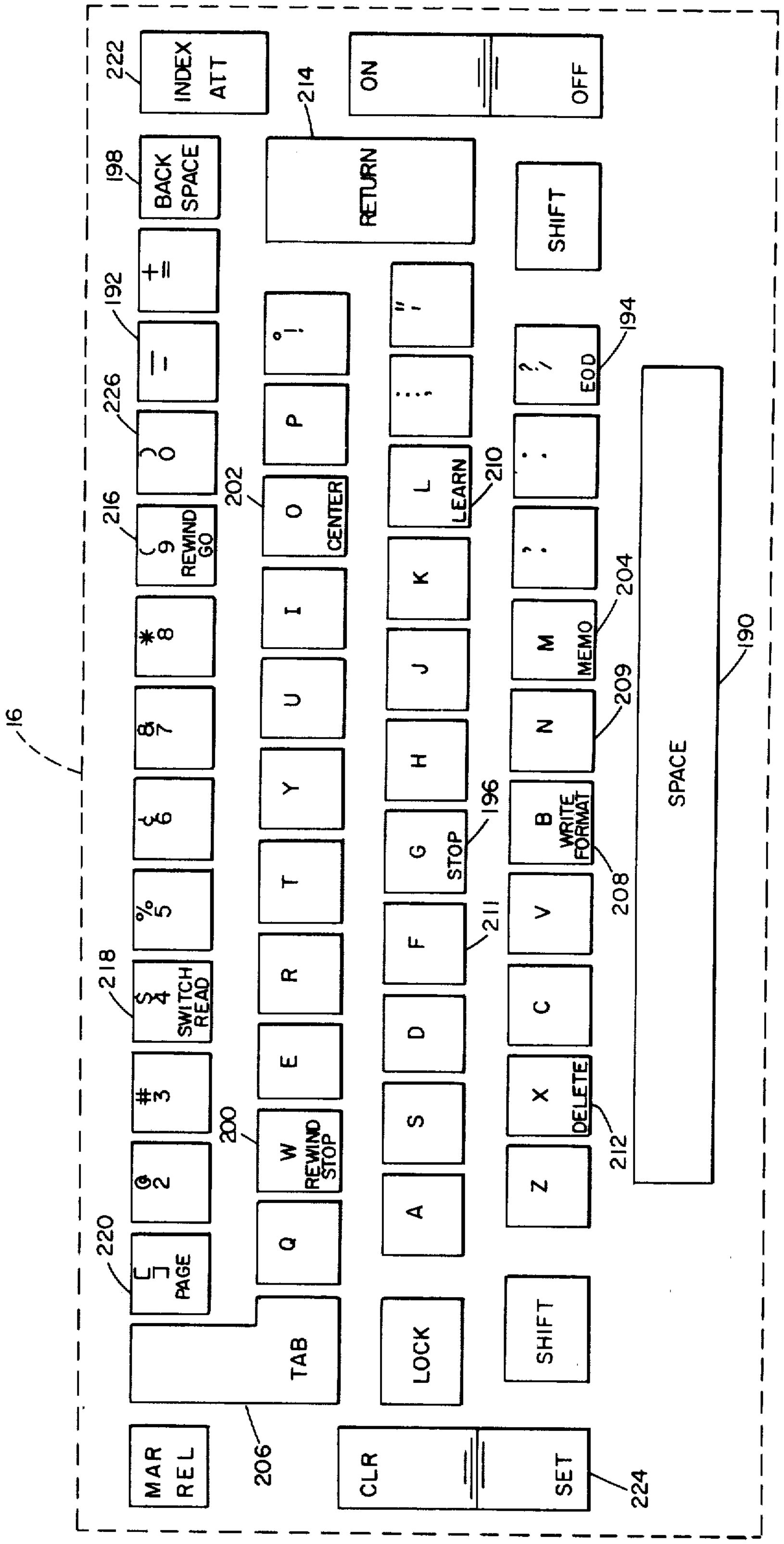
FIG. 3 shows a portion of the keyboard in more detail.
Figure 4:
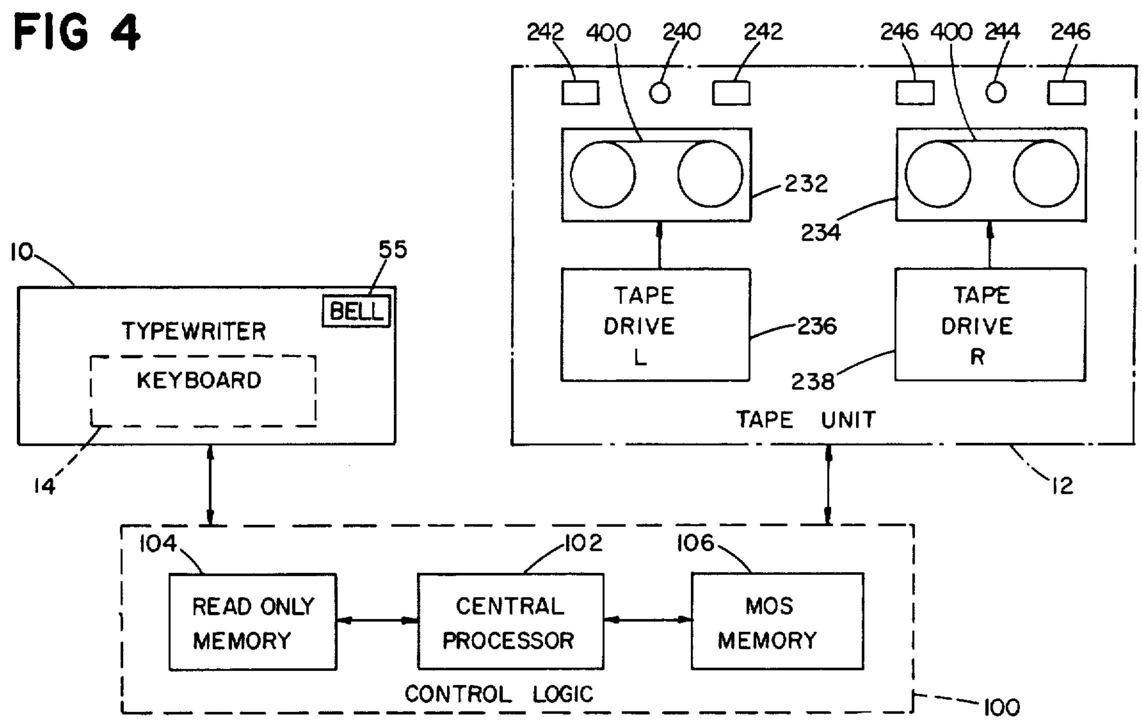
FIG. 4 is a schematic view of the keyboard, control logic and recording means of the system.

Referring to FIGS. 1 through 4, the editing typewriter system 11 of the invention includes a typewriter 10, which is in the present embodiment the typewriter manufactured by IBM under the trademark "Selectric" and described in various widely distributed IBM publications; control logic 100, to be described; and recording means in the form of a tape unit 12, shown schematically in more detail in FIG. 4, holding two conventional tape cassettes providing left cassette 232 and right cassette 234 each containing a tape 400. The tapes are driven by tape drive units 236 and 238 respectively. Tape head 240 reads or writes onto tape 400; head 240 has two positions, in and out. The head must be in for reading and writing, and out for rewind and fast forward motions of tape 400, as well as for inserting and removing the cassette. Photocells 242 distinguish the clear leading portion of the tape from the opaque portion used for recording. Right cassette 234 is provided with similar tape head 244 and photocells 246.

Power for editing typewriter 11 and tape drives 236 and 238 is controlled by on/off button 13.

Keyboard 14, shown in more detail in FIG. 2, includes the standard Selectric keyboard 16 providing alpha-numeric symbol printing keys and additional function keys and lights. On the left portion of keyboard 14 is a group of buttons and indicator lights chiefly related to the operation of tape unit 12. In the upper left corner are two interlocked pushbuttons 18 and 20 that select the left or right tapes (232, 234) in tape unit 12, respectively, to be operated on. Four interlocked pushbuttons 22, 24, 26 and 27 select the Transfer, Play, Record and Edit modes respectively. In the Record mode, numerical values in the form of sequences of binary bits, associated with typed characters or functions, are recorded onto the tape selected by button 18 or 20. In Play mode, numerical values previously recorded on the selected tape are used to control typewriter 10 and to cause it to type corresponding text. In Transfer mode, bit sequences previously recorded on one selected tape together with corrections are recorded onto the other tape. In Edit mode, material recorded on one tape cassette is edited without transfer to the second cassette.

Below these tape control buttons are three tape indicator lights 28 (Tape moving, for left tape 232), 30 (Record) and 32 (Tape Moving, for right tape 234). Below these lights in a slide switch 34 for selecting single or double block recording, and below switch 34 is a vertical row of tape control buttons 36 (Rewind) to rewind the selected tape, 38 (Forward) to wind the selected tape, and 40 (Reset). Reset button 40 is used to restore the status quo after certain erroneous entries, such as attempting to read or record when no tape is present.

To the right of buttons 36–40 are two buttons not controlling tape operations. Line Back button 42 will be discussed later. Code key 44 is used in combination with other keys to generate special numerical values, as will be explained in what follows.

To the right of Selectric keyboard 16 are pushbuttons and indicator lights related to the special playback and editing functions of the editing typewriter system 11 of the invention. In the upper right corner are three interlocked switches 46, 48 and 50, determining the mode of right margin control, which may be unaltered from the input (button 46, "Same"), adjusted within a selected range of spaces (button 48, "Adjust") or right-justified by the insertion of spaces (button 50, "Justify"). Signal light 52 indicates the No Adjust mode; this light is on when a document is played back in the "No Adjust" mode, which will be explained, or when a document is played back in the Adjust mode and a recorded word is reached that, if played back, would start before the adjust zone and end after it.

Signal light 54 (End of Document) lights when an End of Document code is reached on the tape in the "Play", "Transfer", or "Search" mode; or when Memo (Out) button 66 is touched (or Code, Memo Out) and an EOD code is reached before the memo or format is found.

The pushbuttons 56, 58, 60 and 62 (vertical row) generate numerical values that are used to set an internal status register (D) as will be explained in what follows, and are used in cooperation with other control pushbuttons to play selected portions of recorded material, or to control the search procedure.

Auto Start key 64 is used to initiate playback of an entire recorded document. Memo (Out) key 66 is used to initiate playback of a selected portion of stored text, identified by a memo tag, without playing back other portions. Search key 68 generates a search function signal that is used to cause the typewriter to locate a specific portion of stored text. Skip key 70 is used to omit portions of recorded text during playback or transfer.

Figure 8:
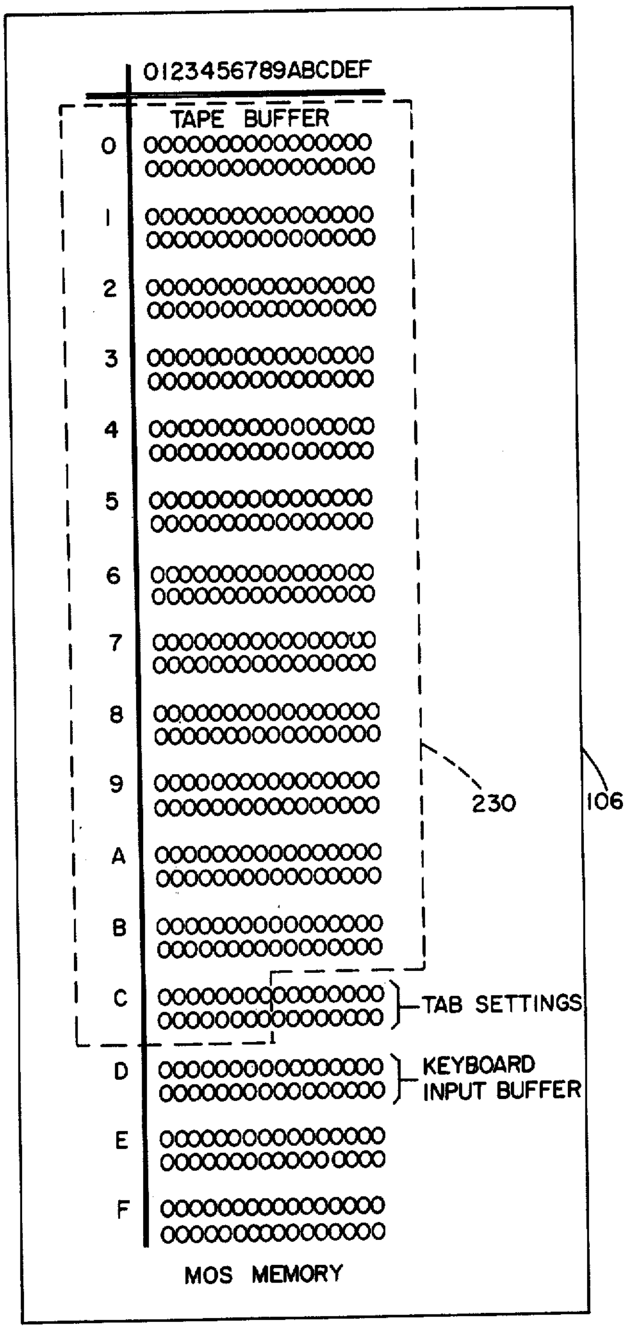
FIG. 8 is a schematic view of the storage means.

The editing typewriter of the invention further provides (FIG. 4) a control logic unit 100, which includes computation means in the form of a central processing unit 102, a read-only memory 104 containing control words, and storage means in the form of a memory 106 including a tape input buffer 230 (FIG. 8). The keys of keyboard 14, when depressed, operate the typewriter 10, and additionally generate printing and function signals in the form of numerical values called codes, uniquely representing the operations of the typewriter. The codes are input to control logic unit 100 and are used to determine the accessing of the control words within read-only memory 104; the control words in turn determine the operation of control logic 100 in storing the codes in memory 106, recording them on tape, or other operation of control logic 100 in storing the codes in memory 106, recording them on tape, or ortherwise operating in response to them. Codes may also be input to control logic 100 from tape unit 12, and may be transmitted to typewriter 10 to direct its typing operations.

OPERATIONAL FEATURES

As text is typed, using the Record mode of the typewriter (set by depressing button 26), each line of typed text (including up to 100 characters) is temporarily stored in tape input buffer 230 of memory 106. When a carriage return is typed at the end of the line by depressing Return key 214, a line end signal is provided and the entire line is transferred from the buffer to one of the tapes. If there are fewer than 100 characters, "padding" characters are added to form a 100-character block. In Play mode, set by depressing button 24, recorded text is transferred from tape to buffer, one line at a time, and is played out. In Transfer mode, set by depressing button 22, recorded text is transferred from a first tape to the buffer 230, providing an opportunity to record changes and corrections in the text which is then transferred to a second tape. In Edit mode, set by depressing button 27, text recorded on a first tape may be edited by deleting or replacing portions, or by adding new material, so long as the limit of 100 characters per line is not exceeded.

The editing typewriter, by means of the tapes, tape buffer, and extra keys described, together with the normal Selectric keys, can be used to provide a variety of editing and playback functions. As each line is typed, before the carriage return key is depressed, corrections may be made within the line by backspacing to the error and striking over it with the correct character, or depressing code key 44 followed by Xx key 212. This combination causes the incorrect character to be deleted. The remainder of the line need not be retyped, but may be merely spaced over to the end, where the carriage return key is struck. Alternatively, the entire line may be deleted using Line Back key 42.

If the text to be altered is in a previously recorded line, either the Line Back function or the Search function allows this text to be accessed for corrections in the same manner.

Insertions or deletions may be made during playback of recorded text using Play button 24 or Skip key 70, together with Paragraph, Line, Word and Character keys 56, 58, 60 and 62. Using two tapes, these keys may be used to produce a corrected tape by transferring correct portions from the first tape to the second, deleting, inserting or correcting during the transfer. This may be accomplished with or without playing out the entire recorded text.

Finally, in the Edit mode, a previously recorded line may be located using either the Line Back function or the Search function; the line may then be edited by replacing or deleting letters or words, or adding new material up to the limit of 100 characters per line. This method of editing provides an alternative to the Transfer mode.

Lines to be centered in the played back text are recorded with an initial Center code but without centering the line, providing an uncentered input line. The line will be automatically centered in the played back text, with respect to the margins then set. The margins need not be those in use when the centered line was recorded in uncentered form.

During playback of recorded text, the right margin may be changed from its position during recording. Using the Adjust feature of the editing typewriter, the lines of played back text will be altered to conform to the new margin. The Adjust feature also permits the user to select the size of a region within which all lines should end. The playback of text will then be interrupted whenever a word cannot be ended within this region; the user then plays out the word character by character, inserting a hyphen or carriage return and line feed where desired. The remaining text is then automatically played back.

The recorded text may be made to conform exactly to a right margin, using the Justify mode. In this mode, spaces are inserted automatically between words to cause each line of text to end at the margin.

The selection of tab stops and right margin, with the adjust zone, may be recorded on tape with the text for later use. In addition, the tab stop settings may be used, with the No Adjust and Required Tab features, to enable a user to type in decimal figures without aligning the decimal points, and to have them played back with virtual decimal points (real or assumed) aligned in tabular form.

Underlined text is typed by backspacing and typing the underscore character, either one letter at a time or a word or line at a time. Each character in the underlined text is automatically stored together with its underscore, and corrections may be easily made in such text.

CODES

Each typed character and function of the editing typewriter is represented by a numerical code. Since the internal operation of the control logic is carried out in the binary number system, the basic unit of information within the logic and the memory is a bit, which may be either zero or one. Eight bits make a byte, divided for convenience into two half bytes of four bits each:

0000 0000.

The decimal equivalent of the binary value of each half-byte can range from 0 to 15 in decimal notation. For convenience these decimal numbers may be represented in hexidecimal notation, that is, with a base of 16 instead of 10; to do this, the letters A through F are used to represent the numbers 10 through 15. We thus have the table of equivalents (Table 1):

Table 1

| binary | decimal | hexidecimal |
|---|---|---|
| 0000 | 0 | 0 |
| 0001 | 1 | 1 |
| 0010 | 2 | 2 |
| 0011 | 3 | 3 |
| 0100 | 4 | 4 |
| 0101 | 5 | 5 |
| 0110 | 6 | 6 |
| 0111 | 7 | 7 |
| 1000 | 8 | 8 |
| 1001 | 9 | 9 |
| 1010 | 10 | A |
| 1011 | 11 | B |
| 1100 | 12 | C |
| 1101 | 13 | D |
| 1110 | 14 | E |
| 1111 | 15 | F |

Referring now especially to FIG. 3, Selectric keyboard 16 provides the usual alpha-numeric and function keys controlling letter selection, shifting, spacing and other functions. Each of these keys operates mechanically to control typewriter operations and additionally generates an alpha-numeric or function signal in the form of a two-digit hexidecimal code uniquely representing the associated alpha-numeric symbol or function. Additionally, certain of the keys may be used in cooperation with Code key 44 to generate special codes representative of the special functions performed by the editing typewriter of the invention.

All the codes employed in the operation of the editing typewriter, in numerical order, are presented with the corresponding alpha-numeric symbol or function of each in Table 2. The symbol (*u*) means that the character is underscored. When a character is upper case, the fourth bit of the high-order digit is one; thus all upper case codes have an upper digit from 8 to F.

Table of codes for all symbols and functions. (Those marked * are standard Selectric codes.)

Table 2

| | |
|---|---|
| *00 x | *30 9 |
| *01 y | *31 0 |
| 02 Required Space | 32 Required Carrier Return |
| 03 Space | 33 Carrier Return |
| *04 a | *34 6 |
| *05 p | *35 5 |
| *06 = | *36 2 |
| *07 j | *37 z |
| 08 Required Hyphen | 38 Rewind |
| *09 / | *39 4 |
| OA (EOD) End of Document | 3A Switch Read |
| OB Stop | 3B Line Space/Page |
| *OC , | *3C 8 |
| *OD ; | *3D 7 |
| *OE f | *3E 3 |
| *OF g | *3F 1 |
| *10 W | 40 -(u) |
| *11 s | 41 y(u) |
| 12 Required Backspace | 42 Load Search Buffer |
| 13 Backspace | 43 Upper Case Shift |
| *14 i | 44 Q(61) |
| *15 ' | 45 p(u) |
| *16 . (lower case) | 46 =(u) |
| *17 ! | 47 j(u) |
| 18 Rewind and Stop | 48 Search and Play (Card Reader) |
| *19 o | 49 /(u) |
| 1A Center | 4A (not used) |
| 1B Memo | 4B (not used) |
| *1C a | 40 ,(u) |
| *1D r | 4D :(u) |
| *1E v | 4E f(u) |
| *1F m | 4F g(u) |
| *20 f | 50 w(u) |
| *21 h | 51 s(u) |
| 22 Required Tab | 52 Search |
| 23 Tab | 53 Lower Case Shift |
| *24 k | 54 i(u) |
| *25c | 55 '(u) |
| *26 n | 56 .(lower case, u) |
| *27 t | 57 !(u) |
| 28 Write Format Block | 58 Rewind Control |
| *29 l | 59 o(u) |
| 2A Learn | 5A (not used) |
| 2B Delete | 5B (not used) |
| *2C c | 5C a(u) |
| *2D d | 5D r(u) |
| *2E u | 5E v(u) |
| *2F x | 5F m(u) |
| 60 b(u) | *90 W |
| 61 b(u) | *91 S |
| 62 Read Format Block | 92 Set Tab |
| 63 Read Memo Block | 93 (not used) |
| 64 k(u) | *94 I |
| 65 e(u) | *95 " |

Table 2-Continued

| | |
|---|---|
| 66 n(u) | *96 . |
| 67 t(u) | *97 ° |
| 68 (not used) | 98 (not used) |
| 69 l(u) | *99 0 |
| 6A (not used) | 9A (not used) |
| 6B (not used) | 9B (not used) |
| 6C c(u) | *9C A |
| 6D d(u) | *9D R |
| 6E u(u) | *9E V |
| 6F x(u) | *9F M |
| 70 9(u) | *A0 B(not used) |
| 71 0 (zero)(u) | *A1 H(not used) |
| 72 Block Link | A2 Clear Tab |
| 73 Line Return | A3 (not used) |
| 74 6(u) | *A4 K |
| 75 f(u) | *A5 E |
| 76 2(u) | *A6 N |
| 77 z(u) | *A7 T |
| 78 (not used) | A8 (not used) |
| 79 4(u) | *A9 L |
| 7A (not used) | AA Tape Pad |
| 7B (not used) | AB (not used) |
| 7C 8(u) | *AC C |
| 7D 7(u) | *AD D |
| 7E 3(u) | *AE U |
| 7F ](u) | *AF X |
| *80 _ | *B0( |
| *81 Y | *B1 ) |
| 82 Index | B2 (not used) |
| 83 (not used) | B3 (not used) |
| *84 Q | *B4 ¢ |
| *85 P | *B5 % |
| *86 + | *B6 @ |
| *87 J | *B7 Z |
| 88 (not used) | B8 (not used) |
| *89 | *B9 $ |
| 8A (not used) | BA (not used) |
| 8B (not used) | BB (not used) |
| *8C , | *BC * |
| *8S : | *BD & |
| *8E F | *BE # |
| *8F G | *BF [ |
| C0 _(u) | E0 B(u) |
| C1 Y(u) | E1 H(u) |
| C2 (not used) | E2 (not used) |
| C3 (not used) | E3 (not used) |
| C4 Q(u) | E4 K(u) |
| C5 P(u) | E5 E(u) |
| C6 +(u) | E6 N(u) |
| C7 J(u) | E7 T(u) |
| C8 (not used) | E8 (not used) |
| C9 (u) | E9 L(u) |
| CA (not used) | EA (not used) |
| CB (not used) | EB (not used) |
| CC ,(u) | EC C(u) |
| CD :(u) | ED D(u) |
| CE F(u) | EE U(u) |
| CF G(u) | EF X(u) |
| D0 W(u) | F0 ((u) |
| D1 S(u) | F1 )(u) |
| D2 (not used) | F2 (not used) |
| D3 (not used) | F3 (not used) |
| D4 I(u) | F4 ¢(u) |
| D5 "(u) | F5 %(u) |
| D6 .(u) | F6@(u) |
| D7 °(u) | F7 Z(u) |
| D8 (not used) | F8 (not used) |
| D9 O(u) | F9 $(u) |
| DA (not used) | FA (not used) |
| DB (not used) | FB (not used) |
| DC A(u) | FC *(u) |
| DD R(u) | FD &(u) |
| DE V(u) | FE #(u) |
| DF M(u) | FF [(u) |

Special codes are generated using Code key 44 in combination with another key in the following manner. Code key 44 is first depressed, followed by the selected second key. When the second key has been depressed, its corresponding two-digit (hexidecimal) code is entered into the KA, KB registers 108 and 110 (to be described below) in control logic 100. The upper two bits in KA register 108 are forced to zero, leaving the lower two bits as the first (high-order) digit; the new second (low-order) digit is determined from Table 3:

Table 3

| | |
|---|---|
| Old second digit = 3 | new second digit = 2 |
| 0 | 8 |
| 9 | A |
| F | B |

For example, to get the Rewind code 38, Code key 44 is depressed. Key 216 (C9) is then depressed, causing the code for 9, 30, to be set into KA, KB. Since the two high-order bits are already zero, 3 is unaltered, while 0 is replaced by 8.

In particular, space bar 190 generates a space code 03 when used alone, or, following depression of Code key 44, it generates a required space code 02, which is used when it is desired to have some words or characters appear in the final typed copy with specified spacings, not altered during justification.

Similarly, hyphen key 192, following depression of Code key 44, generates required hypen code 08. An ordinary hyphen may be interpreted by the control logic as unnecessary when adjusting or justifying a recorded text; to retain a hyphen in a word as "mother-in-law", the hyphen is typed as a required hyphen.

Key 194 (?/) is used with Code key 44 to generate end of document code OA. This code ends every recorded document.

Key 196 (Gg) is used with Code key 44 to generate stop code OB. This code is recorded when it is desired to be able to insert material into the played back text, as in the case of playing back "Dear Mr. [stop]" and inserting an appropriate name. A required backspace code 12 is generated by Code key 44 together with backspace key 198, while an ordinary backspace code 13 is generated by backspace key 198 alone. The required backspace code is used to produce a composite character such as ≠ or ∅. In general, when one character is struck over another, the original character is erased from the memory 106; to prevent this, a required backspace code 12 is used in place of the usual code 13.

The rewind and stop code 18 is generated by Code key 44 and key 200 (Ww). This code is employed when a recorded document such as a form letter is to be played out several times; the code causes the tape to be automatically rewound after each playback, followed by a stop to allow insertion of clean paper. The center line code 1A is generated by Code key 44 and key 202 (Oo); when this code is entered before a typed line of characters, the line will be centered automatically when the text is played back.

The memo in code 1B is generated by Code key 44 and key 204 (Mm). Recorded text that is preceded by this code can be selectively accessed on a tape without playing out the other contents of the tape. A required tab code 22 is generated by Code key 44 with tab key 206, while an ordinary tab code 23 is generated by tab key 206 alone. The required tab code 22 is used to provide indented portions of typed text without typing an ordinary tab code 23 before each indented line, and to permit decimal alignment of numbers.

Code key 44 and key 208 (Bb) are used to generate a write format block code 28. This code is used in the Learn mode to cause a format (tabs and right margin) to be recorded on tape. A learn code 2A is generated by Code key 44 and key 210 (Ll). In response to this code, the typewriter types out the characters "earn" and prepares to receive instructions. This code may be followed by a number of possible codes. For example, if the typist types f, the typewriter types out "ormat" and prepares to learn tab settings and right margin. This function will be described in greater detail in what follows.

A delete code 2B is generated by Code key 44 together with key 212 (Xx). This code, typed over a previously typed character in a current line (not yet transferred from buffer to tape), deletes that character without replacing it by another.

A required carrier return code 32 is generated by Code key 44 and return key 214, while key 214 alone generates an ordinary return code 33. Both define the end of a line.

The ordinary return code initiates the transfer of a line of characters from a buffer in memory 106 to the tape. The required carrier return code ends an indented section initiated by the required tab code. This required carrier return is also used to prevent adjusting of lines such as the name and address at the beginning of a letter.

A rewind code is generated by Code key 44 with key 216 ((9) This code causes a tape to be rewound.

A switch read code 3A is generated by Code key 44 with key 218 ($4). This code directs the typewriter to cease reading one tape and begin reading the other.

A "load search buffer" code 42 is generated by a first depression of search key 68 (FIG. 2). The user then types in the initial characters or words of the text to be found on the tape, and again depresses the Search key to generate a code 52, for Search. This function will be described in more detail in what follows. A read format block code 62 is generated by Code key 44 and Memo Out key 66 (FIG. 2), while a read memo block code 63 is generated by Memo Out key 66 alone. These codes control readout from tape. A block link code 72 is generated by Code key 44 and Line Back key 42 (FIG. 2), while a Line Back code 73 is generated by key 42 alone. The Line Back code has alternative functions depending on the mode of operation of the typewriter system and the position of the type head carrier. In Play mode, Line Back code causes the contents of buffer 230 to be cleared, and the tape to back up one line. In Record mode, if the type head is at the left margin, this code causes the tape to back up one line; if the type head is in the middle of a line, the buffer contents are cleared. In Transfer mode, if the type head is at the left margin, the left tape is backed up one line; if the type head is in the middle of a line, the buffer is cleared of characters already typed. Key 222 generates an "Attention" signal for use only when the typewriter is used as an on-line terminal. A set tab code 92 or a clear tabe code A2 is generated by the set/clear rocker key 224.

These special function codes and the keys used to generate them are presented in Table 4.

Table of Function Codes & Keys

Table 4

| CODE CHARACTER | | KEY (S) |
|---|---|---|
| 02 | Required Space | Code Key + Space Bar |
| 03 | Space | Space Bar |
| 08 | Required Hyphen | Code Key + Hyphen Key |
| 0A | End of Document | Code Key + '/' Key |
| 0B | Stop | Code Key + 'G' Key |
| 12 | Required Backspace | Code Key + Backspace Key |
| 13 | Backspace | Backspace Key |

Table 4-Continued

| | CODE CHARACTER | KEY (S) |
|---|---|---|
| 18 | Rewind and Stop | Code Key + 'W' Key |
| 1A | Center | Code Key + 'O' Key |
| 1B | Memo | Code Key + 'M' Key |
| 22 | Required Tab | Code Key + Tab Key |
| 23 | Tab | Tab Key |
| 28 | Write Format Block | Code Key + 'B' Key |
| 2A | Learn | Code Key + 'L' Key |
| 2B | Delete | Code Key + 'X' Key |
| 32 | Required Carrier Return | Code Key + Carrier Return |
| 33 | Carrier Return | Carrier Return Key |
| 38 | Rewind Go | Code Key + '9' Key |
| 3A | Switch Read | Code Key + '4' Key |
| 3B | Line Space/Page Eject | Code Key + ']' Key |
| 42 | Load Search Buffer | Search Key |
| 43 | Upper Case Shift | |
| 38 | Search & Play | Card Reader |
| 52 | Search | Search Key |
| 53 | Lower Case Shift | |
| 58 | Rewind Control | Card Reader |
| 62 | Read Format Block | Code Key + Memo Out Key |
| 63 | Read Memo Block | Memo Out Key |
| 72 | Block Link | Code Key + Line Back Key |
| 73 | Line Back | Line Back Key |
| 82 | Index | Index Key |
| 92 | Set Tab | Set Tab Rocker Switch |
| A2 | Clear Tab | Clear Tab Rocker Switch |
| AA | Tape Pad | |

CONTROL LOGIC

Figure 6:
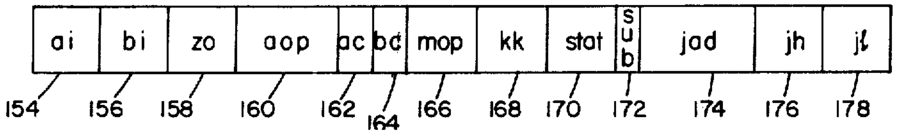
FIG. 6 is a schematic view of the fields of a control word.

Read-only memory 104, whose construction is described in U.S. Pat. appln. Ser. No. 74,369, filed Sept. 22, 1970, now U.S. Pat. No. 3,727,201, issued Apr. 10, 1973 and assigned to the same assignee as this application, contains prewired instructions in the form of control words, controlling the operations of central processor 102 and other parts of the typewriter system 11. The control logic 100 has the capacity to access these stored instructions non-sequentially in response to codes entered through keybarod 14 or tape unit 12, permitting varied and complex operations, involving decisions determining the sequence of instructions, to be performed automatically. Each control word contains 42 bits and is divided into 13 fields (FIG. 6). Fields within a word, to be more fully described in what follows, direct the various internal operations of the typewriter to permit the carrying out of the command. A command is entered as a two-digit code, which is decoded within the control logic and causes branching to the addresses of a sequence of appropriate control words within read only memory 104, in a manner to be described.

Figure 7:
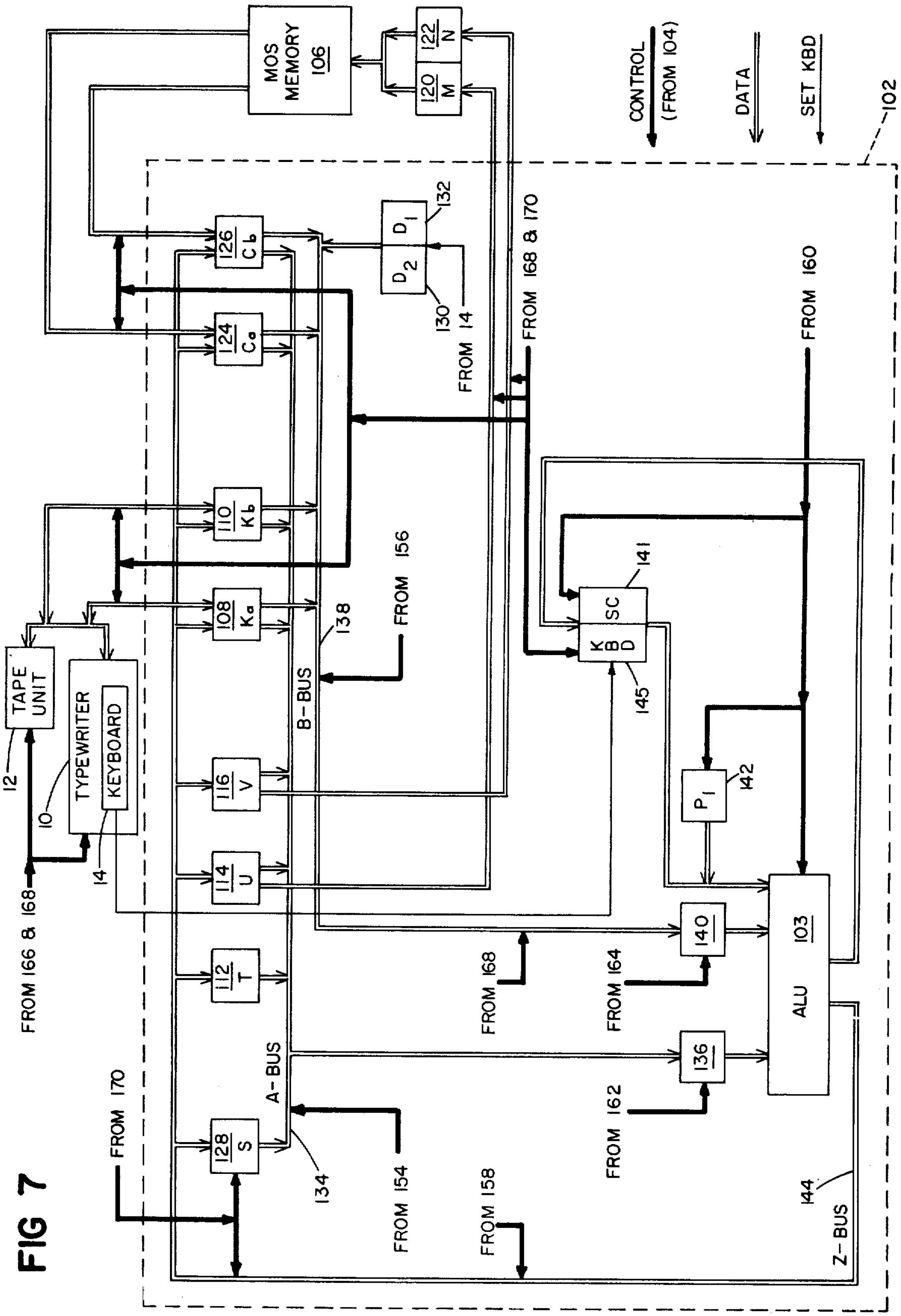
FIG. 7 is a schematic view of a portion of the control logic.

Central processing unit 102, which includes an arithmetic logic unit 103 and several registers, is shown in FIG. 7. All registers are four bits wide, as are all transfer lines.

Input and output between typewriter 10 (including keyboard 14) or tape unit 12 and central processor 102 are through the external communication registers KA (108) and KB (110). The T, U, and V registers (112, 114 and 116) are address arithmetic registers. The M and N registers (120 and 122) are memory access address registers, and may be set by the parallel transfer of the contents of U and V or by transfer of the contents of V to N and of a constant value to M, as will be described. All memory access selection is performed by using the contents of M and N to select a byte in memory 106.

Registers CA and CB (124, 126) are memory communication registers. Data can be sent to these registers from the address in core memory 106 specified by the contents of MN registers 120 and 122, or data can be sent from registers 124 and 126 to that address.

S register 128 is an internal status register, containing four status bits in the arrangement S3, S2, S1, S0. These may be set in response to the status field (stat) in the current control word, or may be set with the output of ALU 103.

Registers D1 and D2 (130, 132) are set by switches on keyboard 14 as follows:

Table 5

| D1 3 | 2 | 1 | 0 | Switch | Function |
|---|---|---|---|---|---|
| | | | 0 | 18 | Select left |
| | | | 1 | 20 | Select right |
| | | 0 | | 34 | Single block recording |
| | | 1 | | 34 | Double block recording |
| 0 | 0 | | | 24 | Play |
| 0 | 1 | | | 26 | Record |
| 1 | 0 | | | 22 | Transfer |
| 1 | 1 | | | 27 | Edit |

| D2 3 | 2 | 1 | 0 | Switch | Function |
|---|---|---|---|---|---|
| | | | 1 | 64 | Auto |
| | 1 | | | 56 | Paragraph |
| | | 1 | 1 | 58 | Line |
| | 1 | 1 | | 60 | Word |
| | 1 | 1 | 1 | 62 | Char/Stop |
| 1 | 1 | | | 70, 56 | Skip, Paragraph |
| | 1 | 1 | 1 | 70, 58 | Skip, Line |
| 1 | 1 | 1 | | 70, 60 | Skip, Word |
| 1 | 1 | 1 | 1 | 70, 62 | Skip, Character |

The D registers internally represent modes of operation selected externally by the user, and are termed external status registers.

The contents of registers S (128), TUV (112, 114, and 116), KA and KB (108 and 110), and CA and CB (124 and 126) can be transferred via the A-bus 134 to arithmetic logic unit 103 through pass-through inhibit switch 136, under the control of a control word in read-only memory 104, as will be described.

The contents of registers D1 and D2 (130, 132), CA and CB (124 and 126), KA and KB (108 and 110), or a constant value specified by the current control word in a manner to be described, can be sent via the B-bus (138) to ALU 108 through add/subtract selection switch 140.

Other inputs to ALU 103 are the saved carry value (SC) (1410) and a plus one source (P1) (142). The KBD bit 145 is a status bit which may be set and tested by the control logic; it is set on when a key on keyboard 14 is depressed.

Output from ALU 103 via the Z-bus 144 may be to the S (128), TUV (112, 114, 116), KA and KB (108 and 110), or CA and CB (124 and 126) registers.

Further details of the type of logic incorporated in portions of this typewriter system may be had by referring to U.S. Pat. No. 3,509,329, issued Apr. 28, 1970, to An Wang et al.

The operations of central processor 102 and memory 106 are controlled by the control words hard-wired in the read-only memory 104. The control word format 152 is shown in FIG. 6.

Each control word is 42 bits in length, broken into 13 fields and laid out as shown in FIG. 6. Each field will control some portion of the circuitry as described in detail below. For definition of functional fields, there are used herein underlined lower case mnemonics (e.g. *ai* will represent the A-bus input field); for definitions of the permissible values of each field, underlined lower case mnemonics contained within quotation marks will be used (e.g., the *ai* field value of *t* will cause the contents of register T to be gated into the A-bus). The fields of a control word are generally divided into computation means control fields (*ai, bi, zo, aop, ac, bc, mop, kk, stat,* and *sub*) and a further field (divided into *jad, jh* and *jl*) for determining the next control word to be accessed.

The 3-bit *ai* (A input) field 154 determines the source of input to A-bus 134. The *ai* field values and the resulting sources for the A-bus may be any of the following:

Table 6 - A-bus input and Z-bus output

| binary value | decimal value | source |
|---|---|---|
| 000 | 0 | S register 128 |
| 001 | 1 | T register 112 |
| 010 | 2 | U register 114 |
| 011 | 3 | V register 116 |
| 100 | 4 | KA register 108 |
| 101 | 5 | KB register 110 |
| 110 | 6 | CA register 124 |
| 111 | 7 | CB register 126 |

The 3-bit *bi* (B input) field 156 determines the source of input to B-bus 138. The *bi* field values and resulting sources may be any of the following:

Table 7 - B-bus input

| binary value | decimal value | source |
|---|---|---|
| 000 | 0 | none |
| 001 | 1 | constant field in control word |
| 010 | 2 | D1 register 130 |
| 011 | 3 | D2 register 132 |
| 100 | 4 | KA register 108 |
| 101 | 5 | KB register 110 |
| 110 | 6 | CA register 124 |
| 111 | 7 | CB register 126 |

The 3-bit zo (Z output) field 158 determines the destination of data transmitted from ALU 103 on *z*-bus 144, and has the same values and corresponding registers as *ai* field 154.

The 3-bit *aop* field 160 determines ALU operations; it has the following possible values and corresponding operations:

Table 8 - arithmetic operations

| binary value | hexidecimal value | operation |
|---|---|---|
| 000 | 0 | Add/Subtract A-bus and B-bus inputs |
| 001 | 1 | Add/Subtract the A-bus and B-bus inputs and the Plus One generator output |
| 010 | 2 | Add/Subtract the A and B bus inputs and save the resulting carry (if any) in SC |
| 011 | 3 | Add/Subtract the A and B bus inputs and the contents of SC (the previous saved carry); save resulting carry in SC |
| 100 | 4 | Add/Subtract the A and B bus inputs and the plus one generator output; save resulting carry in SC |
| 101 | 5 | Logical AND of the A and B bus inputs |
| 110 | 6 | Logical inclusive OR of the A and B bus inputs if bc field is set to "add"; logical exclusive OR if bc field is set to "subtract". |
| 111 | 7 | not used. |

The one-bit *ac* field 162 controls input on A bus 134 to ALU 103; a value of 0 inhibits input on this line; a value of 1 permits input.

The one-bit *bc* field 164 selects addition or subtraction by the ALU 103 in response to *aop* field 160.

The four-bit *mop* field 166 controls the transfer of signals between central processor 102 and memory 106 by controlling the loading of the MN address selection registers 120 and 122, and reading from and writing into the selected registers, it further controls transfer of data between typewriter 10 and tape unit 12. This field may have the following values and corresponding operations:

Table 9

| hexidecimal value | memory operations function |
|---|---|
| 0 | No memory access operation. |
| 1 | Transfer the contents of UV to MN; then transfer the contents of CA, CB to the byte of storage pointed to by MN. |
| 2 | Transfer constant field value to register M, V to register N. Then transfer the contents of CA, CB to the byte of storage pointed to by MN. |
| 3 | Transfer a hexidecimal 'F' to register M, constant field to register N. The transfer contents of CA, CB to byte of storage pointed to by MN. |
| 4 | Transfer the contents of UV to MN; then transfer the contents of the byte of storage pointed to by MN to registers CA and CB; storage readout is non destructive. |
| 5 | Transfer the contents of the CS constant field (kk) to register M; transfer the contents of register V to register N; then transfer the contents of the byte of storage pointed to by MN to registers CA and CB; readout is non desctructive. |
| 6 | Transfer a hexidecimal 'F' to register M, CS constant field (KK) to N. Then transfer contents of the byte of storage pointed to by MN to register CA, CB. Storage readout is non destructive. |
| 7 | Set external indicators according to interpretation of kk field and bi field. |
| 8 | Set external controls according to interpretation of kk field and bi field. |
| 9 | Set registers KA, KB according to setting of Adjust, Justify, Same buttons. |
| A | Accept data from tape into registers KA and KB according to interpretation of kk field. |
| B | Transmit data to tape from registers KA and KB according to interpretation of kk field. |
| C | Transfer typewriter tape status to registers KA and KB according to interpretation of kk field. |
| D | Turn on tape according to interpretation of kk field and bi field. |
| E | Turn off tape according to interpretation of kk field and bi field. |
| F | not used. |

The prewired four-bit constant *kk* field 168 may have any four-bit configuration (any value up to hexidecimal *F*).

Of the possible values of the *mop* field, the values 7, 8, *A, B, C, E* and *F* are concerned with external devices. In more detail, when the value of the *mop* field in the current control word is 7, the values of the *bi* and *kk* fields are used to control the external indicator lights as follows:

Table 10

MOP 7 - EXTERNAL INDICATOR

| MOP | 'KK' | 'BI' | |
|---|---|---|---|
| 7 | 1(0001) | 0 | Playback light off (char/stop key) |
| 7 | 1 | 1 | Playback light on |
| 7 | 2(0010) | 0 | End Light off |
| 7 | 2 | 1 | End light on |
| 7 | 4(0100) | 0 | Record light off |
| 7 | 4 | 1 | Record light on |
| 7 | 8(1000) | 0 | No adjust light off |
| 7 | 8 | 1 | No Adjust Light On |

Any combination of these functions may be obtained according to the value of the *kk* field.

When the value of *mop* is 8, the values of the *bi* and *kk* fields set various controls of the typewriter as follows:

Table 11

MOP 8 - SET EXTERNAL CONTROLS

| MOP | 'KK' | 'BI' | | KA | KB |
|---|---|---|---|---|---|
| 8 | 1 | 0 | Unlock Typewriter Keyboard | | |
| 8 | 1 | 1 | Lock Typewriter Keyboard | | |
| 8 | 2 | | Ring Bell | | |
| 8 | 4 | 0 | Send $KA_1$, $KA_0$, $KB_3$, $KB_2$, $KB_1$, $KB_0$ to Selectric (Inner Group) | | |
| 8 | 4 | 1 | Send to Selectric the following codes (Outer Group) | KA | KB |
| | | | Space | 0 | 3 |
| | | | Bk space | 1 | 3 |
| | | | Tab | 2 | 3 |
| | | | Index | 8 | 4 |
| | | | Carrier Return | 3 | 3 |
| | | | Shift Up | 4 | 3 |
| | | | Shift Down | 5 | 3 |
| | | | Set Tab | 9 | 2 |
| | | | Clear Tab | A | 2 |

When the value of *mop* is *A*, the four bits of KB register 110 are set in response to signals from the tape:

Table 12

MOP A — TAPE INPUT

Set $KB_0 = 1$ if flux change on tape track 1
Set $KB_1 = 1$ if flux change on tape track 0
Set $KB_2 = 1$ if left photocell sees opaque tape
Set $KB_3 = 1$ if right photocell sees opaque tape When the value of *mop* is *B*, data is read onto the tape as follows:

Table 13

MOP B — TAPE OUTPUT

Change recording current level of track 0 according to bit $KB_0$.
Change recording current level of track 1 according to bit $KA_0$.

When the value of *mop* is *C*, bits representative of the status of tape or typewriter are input to KB register 110:

Table 14

MOP C — DEVICE STATUS INPUT

1 to $KB_0$ if typewriter is set for double spacing
1 to $KB_1$ if typewriter is ready
1 to $KB_2$ if left tape head is out
1 to $KB_3$ if right tape head is out The values of *mop* of *D* and *E* control the left and right tape motors and the recording current according to the values of the *bi* and *kk* fields in the current control word:

Table 15

MOP D - Tape motor ON controls
MOP E - Tape motor OFF controls
bi = 1:recording current on
bi = 0:recording current off
bit 0 'KK' = 0:left tape unit
bit 0 'KK' = 1:right tape unit
bit 1 'KK' = 0:forward
bit 1 'KK' = 1:reverse
bit 2 'KK' = 1:head out
bit 2 'KK' = 0:head in
bit 3 'KK' = 0:low speed
bit 3 'KK' = 1:high speed The four-bit *stat* field 170 determines the setting of five status bits, four in Status register 128 together with the KBD bit 145. The possible values of this field together with the resulting operations are:

Table 16

| Value | | Status Field Function |
|---|---|---|
| 0 | | Do not set status bits. |
| 1 | bit 0 | |
| 2 | bit 1 | Set the appropriate bit of register S on unconditionally. |
| 3 | bit 2 | |
| 4 | bit 3 | |
| 5 | bit 0 | |
| 6 | bit 1 | Set the appropriate bit of register S off unconditionally. |
| 7 | bit 2 | |
| 8 | bit 3 | |
| 9 | | Set the KBD bit off. |
| A | | Set SO on if the ALU output is non-zero. |
| B | | Set S1 on if the output of the ALU is zero. |
| C | | Not used |
| D | | Set all the bits of registers S off unconditionally. |
| E | | not used. |
| F | | Allow z-bus transfer to S register. |

The one-bit *subr* field 172 has two possible values: zero, with the function, "Do not save the current control word address," and one, with the function, "Save the ten high order bits of the current control word address field". This saved address goes to the lower position of a two-level stack; any previously saved address goes to the higher level of the stack.

The last three fields, *jad*, *jh* and *jl* (174, 176 and 178) are used to determine the address of the next control word to be accessed in read-only memory 104. (The letter *j* stands for jump, *ad* for address, *h* for high order, and *l* for low order.) The nine-bit *jad* field 174 contains the high-order jump address, and the two 3-bit fields 176 and 178 are interpreted to provide the last two bits of the address.

Figure 5:
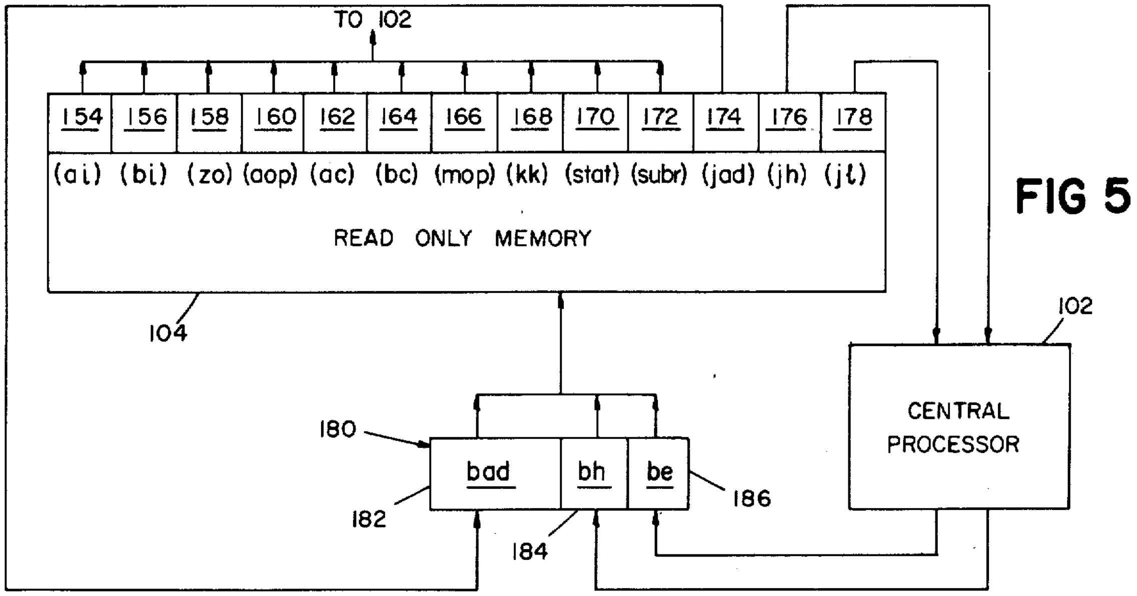
FIG. 5 is a schematic view of the read only memory portion of the system.

FIG. 5 shows schematically the read-only memory 104 and its 11-bit Control Storage Address register 180, which contains three fields, *bad*, *bh*, and *bl* (182, 184, 186). The *jad* field 174 in the currently accessed word is loaded into the *bad* field 182 of storage address register 180, while the three-bit *jh* and *jl* fields must be evaluted to determine the one-bit inputs to *bh* (184) and *bl* (186).

The possible values of these address fields and the resulting values set into the *bh* and *bl* fields are:

Table 18

| Jump Address Fields | | |
|---|---|---|
| jh: | 000 | set "0" into bh unconditionally |
| | 001 | set "1" into bh unconditionally |
| | 010 | set S register bit S1 into bh responsive to stat field |
| | 011 | set S register bit S3 into bh |
| | 100 | not used |
| | 101 | if the current ALU output had a carry, set bh to "1"; otherwise set to "0" |
| | 110 | set contents of KBD bit into bh |
| | 111 | if current ALU output = o, set bh = "1"; otherwise set it to "0" |
| jl: | 000 | set "0" into bl unconditionally |
| | 001 | set "1" into bl unconditionally |
| | 010 | set S register bit S0 into bl |
| | 011 | set S register bit S2 into bl |
| | 100 | if the ALU output is zero, set bl to "1"; otherwise set it to "0" |
| | 101 | if current ALU output had a carry, set bh to "1"; otherwise set to "0" |
| | 110 | set contents of SC bit into bl |
| | 111 | Subroutine setting: restore saved ten high-order bits of the control word address (bad & bh) from the lower level of the stack and place a "1" in the bl field. The higher saved address (if any) will move to the lower position. |

A single control word may specify several different functions to be performed by the hardware. Therefore an order must be specified in which these functions will be performed. This sequence is follows:

1. Set the memory access address registers MN 120, 122) if required by *mop* field 166.
2. Select A-bus (134) and B-bus (138) sources and Z-bus (144) destination according to the *ai*, *bi*, and *zo* fields respectively (154, 156, 156).
3. Perform A and B input controls as specified by the *ac* and *bc* fields (162, 164).
4. Select the operation to be performed on the inputs as specified in *aop* field 160, and pass the A and B inputs through to ALU 103.
5. Save subroutine address if required.
6. Calculate the jump address from the *jad*, *jh*, and *jl* fields (174, 176, 178).
7. Pass the output of ALU 103 along Z-bus 144 to its destination.
8. Save the carry if *aop* field 160 requires it.
9. Set the status according to *stat* field 170.
10. Perform operation specified by the *mop* field.
11. Fetch the next control storage word.

MEMORY AND BUFFER

The random access memory 106 is shown schematically in FIg. 8. It comprises 16 registers each including 16 bytes, or 256 bytes in all. Each byte comprises eight bits, divided into upper and lower order half-bytes.

Bytes 00 through C7, shown as region 230 in FIG. 8, are the portion of memory 106 used as the tape buffer. Characters typed on typewriter 10 are stored here, beginning in byte 00, before being transferred to a tape, or are read into these registers from tape before being typed. Bytes C8 through CE are used for tab stop settings; byte CF contains the number of required tabs active (upper half byte) and number of tabs set (lower half byte).

Register D is the typewriter input buffer and contains, in bytes DO-DE, characters input from the typewriter. The lower half-byte of DF contains the number of characters in the buffer. The upper half-byte is not used.

The lower half-byte of byte E0 contains a 3-bit number representative of the "endpage action status", or action to be taken at end of a page. The possible values and corresponding actions are:

| | |
|---|---|
| 100 | Continue playback |
| 101 | Stop playback |
| 110 | Page eject and continue (for continuous printout paper) |
| 010 | Switch read, page eject and continue |
| 001 | Switch read and stop |

The highest order bit in this half-byte contains the autoformat flag; a value of 1 means "set recorded formats automatically" and a value of 0 means "ignore recorded formats during playback". The upper half-byte of E0 is not used.

Byte E1 contains a binary number set in Learn mode that specifies the number of lines to be typed per page.

Byte E2 contains a binary number set in Learn mode that specifies the number of lines that constitute a physical page; this number is automatically set to 66 (hexidecimal 42) when the power is turned on. Byte E3 contains the number of lines typed thus far on a current page. Bytes E4 through EB are not used.

Byte EC is the justify start pointer; this number indicates the first space at which a new space will be inserted in justification.

Byte ED is not used.

The upper half-byte of byte EE contains the "NORD" (F1) flag (bit 0) and the "ALIGN FLAG" (bit 2). These flags are used in the EDIT mode.

The low order half byte of EF contains a number indicating the number of further attempts to read a tape that will be made if an error occurs during the current attempt. The high-order half-byte of EF is not used.

Byte F0 contains the adjust zone start pointer, representing the location of the first column of the adjust zone relative to the left margin.

Byte F1 contains the right margin pointer, indicating the location of the last column of the adjust zone relative to the right margin.

Byte F2 is a work byte.

Byte F3 is the "character status" stack. Possible values of each half-byte are:

0 Character end character
1 word end character
2 line end character
4 paragraph end character
8 auto end character.

Byte F4, upper half byte, contains parameters representing the same, adjust or justify modes, and advance, skip or wait instructions. The four bits of this half-byte have the following possible values:

| | |
|---|---|
| 0 bit = 1 : advance or skip | = 0 : wait |
| 1 bit = 1 : skip | = 0 : advance or wait |
| 2 bit = 1 : adjust or justify | = 0 : same |
| 3 bit = 1 : justify | = 0 : same or adjust |

The lower half byte of byte F4 has the possible values:

0 advance/skip 1 character
1 advance/skip to word end
2 advance/skip to line end
4 advance/skip to paragraph end
8 advance in auto mode.

Bytes F5 and F6 contain status bits that are used in keeping track of the operation of the tape and typewriter, specifically left/right tape selection, keyboard locked/unlocked, upper/lower case, read format/memo flag, tape backup flag, centered/memo line flag, no-adjust recording flag, search flag, line spacing flag and other status bits. Those related to the special functions of the editing typewriter herein described will be explained in detail in connection with the description of the functions in what follows.

Byte F7 is the "current character byte" and contains the code currently being processed by the control logic; such a code may, for example, represent a character being moved to or from a buffer.

Byte F8-FB are work bytes, whose particular use depends upon the procedure being executed. Byte FC contains the position of the Selectric type head carrier relative to the left margin. Byte FD contains the number of backspaces of the carrier from the rightmost typed character in the current line. Byte FE, the current tape buffer pointer, indicates the next character in the buffer to be processed.

Byte FF contains a pointer PL; PL-1 indicates the last character contained in the tape buffer.

POWER TURNED ON

Figure 9:
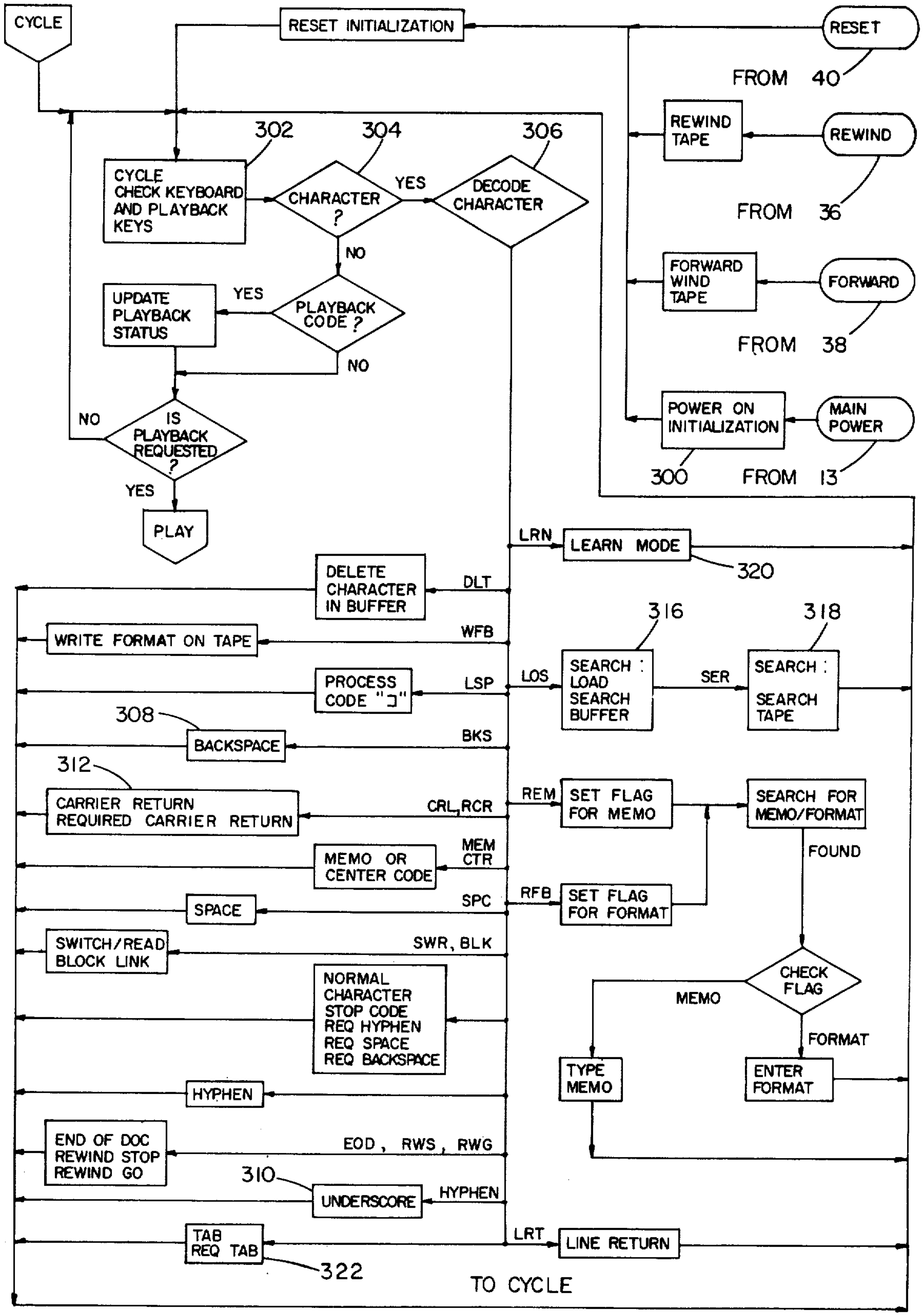
FIGS. 9 and 10 are flow charts illustrating the operation of the editing system typewriter as a whole.
Figure 10:
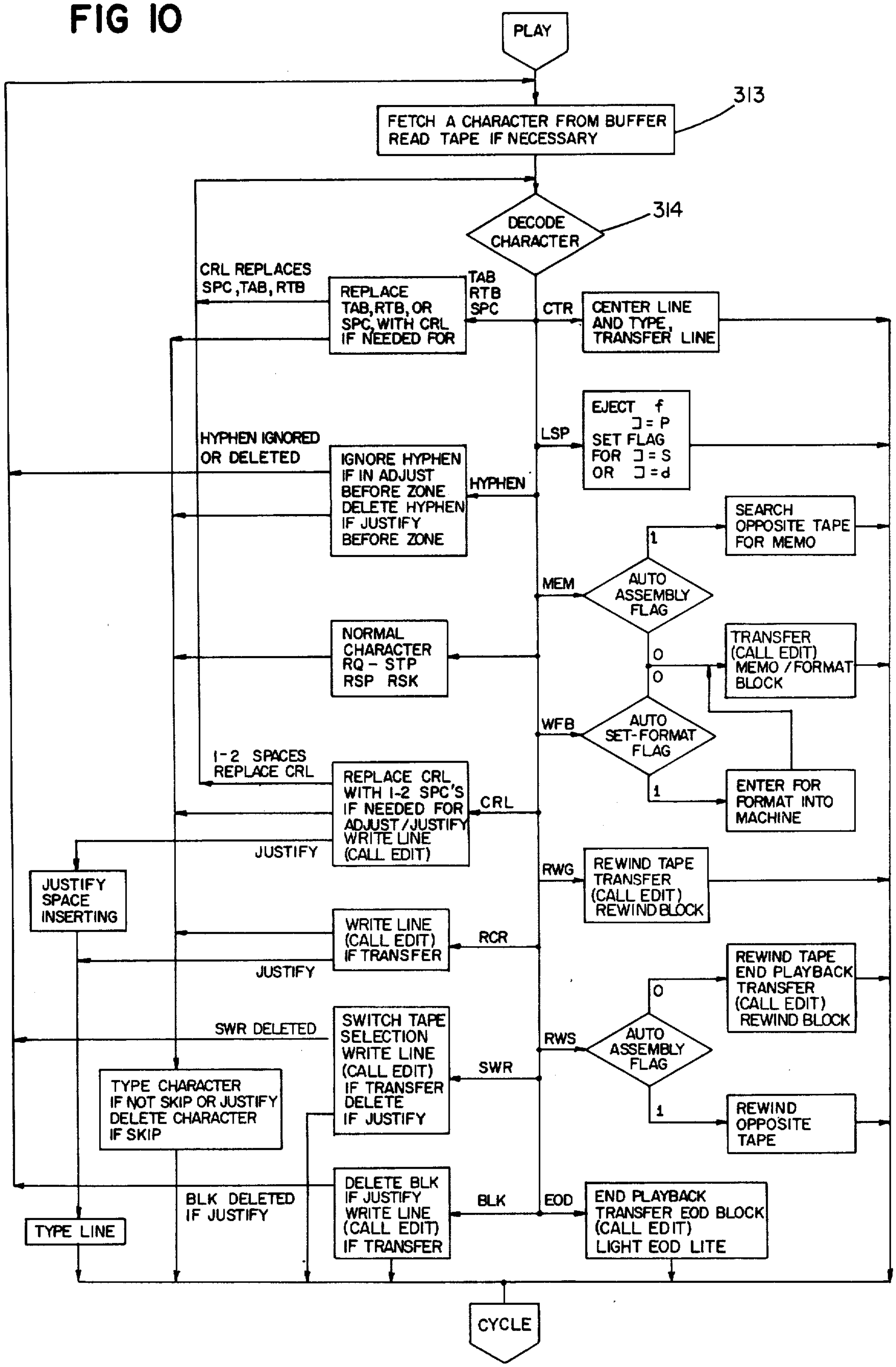

FIGS. 9 and 10 are flow charts, schematically showing the various modes of operation of the editing typewriter.

When power is turned on at on/off button 13 (FIGS. 1 and 9), a series of initializing steps (box 300, FIG. 9) are automatically performed under the direction of control logic 100. All the contents of memory 106 are set to zero, and certain parameters are then automatically set with initial values. A physical page length of (decimal) 66 (the number of lines that make up a standard 11 inch page) is read into byte E2 of memory 106: the right margin pointer in byte F1 is set to (decimal) 66; and a page size of 50 (the standard number of typed lines on an 11 inch long page) is set to (decimal) 50 in byte E1. Byte F0 contains the adjust zone start pointer, which is the location of the last column of the adjust zone relative to the left margin; this number is initially set to 01.

The "endpage action" in byte E0, specifying the action to be taken when the end of the page is reached, is set to 00 ("continue playback"). Further steps, performed automatically after the power is turned on, include setting the required tab counter in byte CF to zero, setting the buffer pointer in byte DF to zero, and setting on the upper case flag in byte F5. The typewriter 10 then returns the print head carriage to the left margin and stores a zero in byte FC, the location of the carrier position from the left margin. Relevant portions of memory 106 now have this format:

| | 0123456789ABCDEF | |
|---|---|---|
| 0 | 0000000000000000 | beginning of tape buffer |
| | 0000000000000000 | |
| | — | |
| D | 0000000000000000 | typewriter input buffer and |
| | 0000000000000000 | counter |
| E | 0340000000000000 | |
| | 1220000000000000 | |
| F | 04F0000000000000 | |
| | 1200000000000000 | |

After power is turned on and the initializing steps have been performed as described, if there is no input, the machine is in the CYCLE condition (box 302, FIG. 9), during which control logic 100 automatically and repeatedly accesses a sequence of control words 152 in read-only memory 104, and under the control of these words, status indicators are continually tested. Two condition of KBD bit 145 is tested by the following automatically accessed control word:

| | ai | bi | zo | aop | ac | bc | mop | kk | st | sbr | jad | jh | jl |
|---|---|---|---|---|---|---|---|---|---|---|---|---|---|
| 4241: | 7 | 0 | 0 | 0 | 1 | 0 | 0 | 0 | F | 0 | 172 | 6 | 0 |

(The number 4241 represents the number of this word in a listing of all control words and has no operational significance.) The numerical values of these fields, as will be seen by referring to tables 6 through 19, have the following significance: The A-bus source is CB register 126; there is no B-bus source; the Z-bus destination is S register 128; the arithmetic operation is addition (*aop* = 0 and *bc* = 0); and the result is that the contents of CB register 126 are transferred to S register 128. The value "F" of the status field 170 allows transfer to the S register. There is no memory operation (*mop* = 0) and the branch to the next control word 152 to be executed is determined by jh field 176: the value 6 in this field means that the contents of KBD bit 146 will be set into bh field 184 of the address to be accessed next.

If KBD bit 145 is off (value of zero), no input code is found, and the next accessed control word determines further repeated testing of status indicators as the CYCLE condition continues. When a character key is depressed on keyboard 14, the corresponding code is input to keyboard registers 108 and 110 and at the same time, KBD bit 145 is set on, this condition is detected (box 304, FIG. 9) and the control word next accessed as a result initiates an appropriate sequence of operations.

STORAGE OF TYPED CHARACTERS: UNDERLINING

As an example of the way in which the control logic 100 controls the temporary storage of typed characters before they are transferred to tape, as well as an example of the way in which underlined characters are handled, the entry of the line of characters

*ss*

(followed by a carriage return) will now be described.

The codes for this line of characters, as will be seen by referring to Tables 2 and 4, are

11, 11, 13, 80, 33 representing the successive operations type *s*, type *s*, backspace, underscore, carriage return.

When the first lower case *s* is typed, the code 11 is entered from keyboard 14 into KA, KB registers 108 and 110. The lower half-byte DF is then set to 1, representing the number of characters in the typewriter buffer; and the code 11 is stored in the left-most position in the buffer, in byte D0. These steps are accomplished in the following manner.

When the first lower case *s* is typed, the code 11 is entered from the keyboard into KA, KB registers 108 and 110 and KBD bit 146 is set on; as a consequence, the next control word executed after 4241 is 4245:

| | ai | bi | zo | aop | ac | bc | mop | kk | st | sbr | jad | jh | jl |
|---|---|---|---|---|---|---|---|---|---|---|---|---|---|
| 4245: | 7 | 0 | 7 | 1 | 1 | 0 | 0 | 0 | 9 | 0 | 172 | 5 | 1 |

Again referring to tables 6 through 19, the A-bus source is CB register 126, there is no B-bus source, the Z-bus destination is also the CB register, the arithmetic operation is addition with the output of plus-one generator 142. There is no memory operation; the status field value of 9 results in setting off KBD bit 145. The CB register, as a result of an earlier executed control word, contains the value stored in byte DF of memory 106, which is the counter for the typewriter input buffer, and records the number of characters in that buffer. This value is not incremented by one; the value of 5 for *jh* means that the next control word to be accessed depends upon whether or not a carry resulted from adding the one to the counter value. If a carry resulted, then too many characters have been input, and a subroutine is executed that locks the keyboard to prevent further input until the characters already input can be processed. When no carry results, the next control word accessed is 4248:

4248: 0 0 3 0 1 0 2 D 0 0 19C 0 0

The value of 2 in the memory operation field causes the constant field value of "D" to be set into M register 120, and the contents of V register 116 into the N register 122. The V register at this time contains the value F, set there by a previously executed control word. The value of 2 in memory operation field 166 then causes the contents of CA, CB registers 124 and 126 to be transfered to the byte whose address is in MN, specifically to byte DF. The CA, CB registers contain the incremented count of characters in the typewriter buffer, which is thus read into byte DF, replacing the previous value. The contents of S register 128 (*ai* = 0) are then transferred to V register 116 (*zo* = 3, *aop* = 0 and *ac* = 1).

The next two control words are accessed unconditionally:

4252: 4 0 6 0 1 0 0 0 0 0

The contents of KA register 108 are transferred to CA register 124; there is no memory operation. KA register 108 contains the upper half byte of the input code, which is thus transferred to the CA register.

4253: 5 0 7 0 1 0 2 D 0 0

The memory operation field value of 2 causes the MN registers to be set with D (from the constant field) and 0 (from the V register) respectively. The contents of KB register 110 (that is the lower half byte of the code) are then transferred to CB register 126; the contents of the CA and CB registers are then transferred together to byte D0 of memory 106. Thus, the code 11 is temporarily stored in the left-most position in the buffer. The relevant portions of memory 106 now have this format:

| | 0123456789ABCDEF | |
|---|---|---|
| 0 | 0000000000000000<br>0000000000000000 | beginning of tape buffer |
| | — | |
| D | 1000000000000000<br>1000000000000001<br>code "11" counter | Typewriter input buffer |
| E | 0340000000000000<br>1220000000000000 | |
| F | 04F000000F000000<br>1200000000000000 | |

The code 11 is then read into current character byte F7, and a series of decoding steps (box 306, FIG. 9) are performed to determine the way in which the character code should be handled. The typewriter buffer counter in DF is set to zero.

These steps are accomplished by the following operations. Control word 4255 is accessed unconditionally after word 4253.

4255: 0 0 5 0 0 0 6 9 0 0

The values of the fields determine that the A-bus source is inhibited, there is no B-bus source, the Z-bus destination is KB register 110, and the arithmetic operation is addition. This results in setting a zero into the KB register. The memory operation field value of 6 results in setting M to F and setting 9 (from the constant field) into N. Thus the contents of byte F9 are read out to the CA, CB registers 124 and 126. This results in restoring a value that was stored at byte F9 before execution of word 4241. The next word is also accessed unconditionally:

4256: 6 0 4 0 1 0 C A 0 0

The value previously read into CA register 124 is now transferred to KA register 108, while the status of particular external devices is read into KB register 110. The particular value read in this case is 0, or in binary form 0000, representing that the typewriter is set for single space, that the typewriter is not ready for input, and that both tape heads are in.

The next word is also accessed unconditionally:

4257: 7 0 3 2 1 0 6 E D 0 000 0 7

This results in transferring the contents of CB register 126 to the V register, saving the carry (if any), and setting all status bits off (Status field = D). The memory opepation is reading out the contents of FE to the CA, CB registers 124 and 126. The *jl* value of 7 determines a return from the subroutine and restoring of the previously stored address, with the result that the next word accessed is CY5B, part of the "CYCLE" routine of words that was being executed when the input code was detected.

CY5B: 0 1 2 0 0 0 0 3 0 0

(The characters CY5B are a mnemonic tag for this control word in a listing of all such words and have no operational signficance.) Execution of this word results in setting 3 from constant field 168 into U Register 114. The next word is accessed unconditionally,

CY5C: 0 1 1 0 0 0 0 4 0 1 1A4 1 1

Execution of this word sets "4" from constant field 168 into T register 112. A subroutine to read the status registers for any new playback requests is then accessed unconditionally. During this subroutine, the contents of D2 register 132 and D1 register 130 are successively tested, and if necessary, the playback status request flag in byte F4 is altered. Play and record lights are also set in accordance with the playback request status.

The most recently input code 11 is then read into current character byte F7 by the execution of these two control words:

4282: 0 1 2 0 0 0 5 D 0 0

(Read out contents of byte D0 to CA, CB registers 124, 126.)

4283. 3 0 3 4 1 0 3 7 0 0 14C 1 0

(Store contents of CA, CB registers in byte F7, the current character byte.) A subroutine is then unconditionally accessed and executed that causes readout of the entire typewriter input buffer (bytes D0 through DE of memory 106) to check for any saved characters. The counter in byte DF is moved to byte DE, and the contents of byte DF are reset to zero. Finally the code 11 stored in the current character byte F7 is read into the CA, CB registers, the stored address of the command that preceded the subroutine is restored, and the next command in the CYCLE routine is accessed. This control words tests the S register contents for indication of the presence of an input character, and finding one, branches to a decode routine. This comprises a series of steps in which the lower half byte of the input code is exclusive-or'd with a succession of constant field values. As a result, the input code is identified as a normal Selectric alpha-numeric character code, rather than, for example, a backspace, underscore, space or carriage return Consequently the next control word accessed initiates a subroutine for inserting the input character in the tape storage buffer (bytes 00 through C7 of memory 106).

The relevant portions of memory 106 at this time have the format:

| | 0123456789ABCDEF | |
|---|---|---|
| 0 | 0000000000000000 | beginning of tape buffer |
| | 0000000000000000 | |
| | — | |
| D | 0000000000000000 | typewriter input buffer |
| | 0000000000000010 | |
| E | 0340000000000000 | |
| | 1220000000000000 | |
| F | 04F000010F000000 | |
| | 1200000100000000 | |

Storing the input character in the tape buffer involves a series of steps in which the counters in bytes FF and FE are tested to determine the location at which the code should be stored. When these counters are found to be both zero, the code 11 is stored in byte 00, and the counter in FF is incremented to 01. The counter in FE is incremental to 01, the address of the next character in the tape buffer to be processed. Finally the page pointer in byte FC, indicating the location of the type head carrier from the left margin, is set to 01. These steps are the result of execution of the following control words.

The first control word is accessed as a result of the identificatiaon of the code 11 as a normal Selectric character code:

4356: 0 0 0 0 0 0 6 E 0 0

The contents of byte FE, representing the address of the next character in the tape buffer, are read out to CA, CB registers 124 and 126. In the present instance the tape buffer is empty, and the value in byte FE is 00. The next word is accessed unconditionally:

4357: 6 1 6 6 1 1 0 6 0 0

Execution of this word causes the constant field value 6 to be exclusive-or'd with the contents of register CA, and the result replaced into register CA.

The next word is accessed unconditionally:

4358: 7 1 7 6 1 1 0 3 0 0

Execution of this word causes the constant field value 3 to be exclusive-or'd with the contents of register CB, and the result replaced into register CB. Again, the next word is accessed unconditionally:

4359: 6 7 0 6 1 0 6 F 0 0 14E 0 4

Execution of this word causes the inclusive or'ing of the contents of the CA and CB registers. The result of this arithmetic operation is used to determine what control word will be accessed next. The contents of byte FF, containing the counter PL, is read out to the CA, CB registers; in the present instance, the contents of byte FF are zero.

The effect of execution of control words 4356, 4357, 4358 and 4359 has been to inquire whether the next address in the tape buffer is less than or equal to hexidecimal 63, or decimal 99. If the next address is less than 99, the result of the arithmetic operation of word 4359 is non-zero, while if the next address is 99, the result is zero; the branch to the next control word is determined by this, since $jl = 4$.

In the present instance, the next address is 00, and accordingly the next control word executed is

4362: 6 1 6 6 1 1 0 C 0 0 19E 1 0 which causes the contents of the CA register (containing the upper half-byte of the counter PL in byte FF, PL-1 representing the address of the last character in the tape buffer) to be exclusive-or'd with the constant field value *C*. The result in the present instance is C, which is replaced into register CA. The next word is unconditionally accessed:

4365: 7 1 7 6 1 1 0 7 0 0

Execution of this word causes the contents of the CB register to be exclusive-or'd with the constant field value 7, and the result (in this case 7) is replaced into register CB. The next word is

4366: 6 7 0 6 1 0 6 E 0 0 14E 1 4 which causes the contents of CA and CB registers to be inclusive-or'd together, and the non-zero result is used to determine further branching. These operations have determined that the number of characters in the tape buffer is less than 99.

A similar sequence of control words determines whether or not the number of characters in the buffer is hexidecimal 59 (decimal 89). If it is, the next control word accessed is

4375: 0 0 0 0 0 0 8 2 0 0 14F 0 0 whose memory operation results in ringing typewriter bell 55. If the number is not 59, this word is by-passed; in either case, the next control word accessed is

4374: 0 0 0 0 0 0 6 D 0 0 19F 0 0 which causes the backspace counter to be read out of byte FD into the CA, CB registers.

The next sequence of words tests the backspace counter; if this is found to be zero, as in the present instance, the counter in byte FF is read out to the CA, CB registers, and the lowest order bit in the S-register is set off (stat field 170 = 5). The counter PL in byte FF is then incremented to 01 and restored. Similarly, the counter (address of next character in tape buffer to be processed) in byte FE is read out and incremental to 01. Finally, the code 11 is read out of current character byte F7 and into byte 00 of memory 106, and the carrier position from left margin, stored in byte FC, is incremented to 01. The next word accessed is part of the CYCLE routine, which is then repeated as before until another code is input through the keyboard.

The relevant portions of memory 106 now have this format:

| | 0123456789ABCDEF |
|---|---|
| | stored code "s" |
| 0 | 1000000000000000 |
| | 1000000000000000 |
| | — |
| D | 0000000000000000 |
| | 0000000000000010 |
| E | 0340000000000000 |
| | 1220000000000000 |
| F | 04F000010F000000 |
| | 1200000100001011 |
| | carrier position |
| | next address |

A second lower case *s* is then typed, and the code 11 is similarly stored in the typewriter buffer at D0. The lower half-byte DF is set to 1:

| | 0123456789ABCDEF |
|---|---|
| 0 | 1000000000000000 |
| | 1000000000000000 |
| | — |
| | input "s" |
| D | 1000000000000000 |
| | 1000000000000011 |
| E | 0340000000000000 |
| | 1220000000000000 |
| | 04F0000104000000 |
| | 1200000100001011 |

The counter PL, in byte FF, is then incremented to 02, and the code 11 is read into byte 01 of the tape buffer. The address of the next character, in byte FE, is incremented to 02, as is the page pointer in FC.

| | 0123456789ABCDEF |
|---|---|
| 0 | 1100000000000000 |
| | 1100000000000000 |
| | — |
| D | 0000000000000000 |
| | 0000000000000110 |
| E | 0340000000000000 |
| | 1220000000000000 |
| F | 04F0000104000000 |
| | 1200000100002022 |

A back space is then typed, causing the backspace code 13 to be read into the KA, KB registers; this code is then stored in the typewriter input buffer at byte D0, and the counter at DF is set to 01. The contents of various status registers are tested for any new playback request, and no change is found.

| | 0123456789ABCDEF |
|---|---|
| | ss |
| 0 | 1100000000000000 |
| | 1100000000000000 |
| | — |
| | backspace |
| D | 1000000000000000 |
| | 3000000000000111 |
| E | 0340000000000000 |
| | 1220000000000000 |
| F | 04F0000104000000 |
| | 1200000101002022 |

The input code 13 is then stored in the current character byte F7, and read into the CA, CB registers for decoding.

First, the following word

CY25D: 6 0 0 0 1 0 0 0 F 0 001 0 1 causes the CA register, containing the high-order half byte of the code, to be read into the S register (*ai* = 6, *ac* = 1, *stat* = *F*). The next word is accessed unconditionally:

DECOD: 7 1 0 6 1 1 0 0 0 0 ODC 1 4

The contents of CB (low-order half-byte of the input code) are exclusive-or'd with the constant field value 0. Since this half-byte is not equal to zero, the next word accessed is

DE5A: 7 1 0 6 1 1 0 3 0 0 0DD 0 4 which causes the contents of CB to be exclusive-or'd with the constant field value of 3. Since the result of this operation is zero, the next word accessed is

DE15B: 7 0 3 1 1 0 0 0 6 0 010 2 2 which increments the contents of CB and sets the result into V register 116. The next branch is determined by the contents of the S register 128, which contains the high order half byte of the backspace code, or 1. The word next accessed specifies no arithmetic or memory operation, but is accessed only when the input code is identified as a backspace; it leads unconditionally to a subroutine to update various counters appropriately for backspace (box 308).

The relevant portions of memory 106 now have the format:

| | 0123456789ABCDEF |
|---|---|
| 0 | 1100000000000000 |
| | 1100000000000000 |
| | — |
| D | 0000000000000000 |
| | 0000000000001110 |
| E | 0340000000000000 |
| | 1220000000000000 |
| F | 04F0000104000000 |
| | 1200000301002022 |
| | backspace |

The counter in byte FE (address of next character in tape buffer to process, at present 02) is read out, decremented to 01, and restored. The backspace counter in byte FD (at present 00) is read out, incremented to 01, and restored. The counter in byte FC (carrier position from left margin, at present 02) is read out, decremented to 01, and restored. The relevant portions of memory 106 now have this format:

| | 0123456789ABCDEF | |
|---|---|---|
| 0 | 1100000000000000 | |
| | 1100000000000000 | |
| | — | |
| D | 0000000000000000 | |
| | 0000000000001110 | |
| E | 0340000000000000 | |
| | 1220000000000000 | |
| F | 04F0000104000000 | carrier position |
| | 1200000301001112 | backspace counter |

An underline is then typed, setting the code 80 into registers KA, KB. This code is then stored in the typewriter buffer at D0 and the counter in DF is incremented to 01.

| | 0123456789ABCDEF | |
|---|---|---|
| 0 | 1100000000000000 | |
| | 1100000000000000 | |
| | — | |
| D | 8000000000000000 | underline |
| | 0000000000001111 | |
| E | 0340000000000000 | |
| | 1220000000000000 | |
| F | 04F0000104000000 | |
| | 1200000304001112 | |
| | backspace | |

The code 80 is then read into current character byte F7, decoded and identified as the code for the "underscore" command.

| | 0123456789ABCDEF |
|---|---|
| 0 | 1100000000000000 |
| | 1100000000000000 |
| | — |
| D | 0000000000000000 |
| | 0000000000011110 |
| E | 0340000000000000 |
| | 1220000000000000 |
| F | 04F0000804000000 |
| | 1200000004001112 |

As a result of this identification, a subroutine (box 310, FIG. 9) is executed that recalls the most recently input code from the tape buffer register; the code 11 is read out of byte 01 and numerically converted to the code 51, representing an underlined lower case *s* ; this new code is then read into current character byte F7.

| | 0123456789ABCDEF |
|---|---|
| 0 | 1100000000000000 |
| | 1100000000000000 |
| | — |
| D | 0000000000000000 |
| | 0000000000011110 |

-Continued

| | 0123456789ABCDEF |
|---|---|
| E | 0340000000000000 |
| | 1220000000000000 |
| F | 04F0000504000000 |
| | 1200000104001112 |
| | s |

Using the counter PL stored in byte FF, the new code 51 is then read from byte F7 into byte 01 of the tape buffer, replacing the code 11 previously stored there.

| | 0123456789ABCDEF |
|---|---|
| | ss |
| 0 | 1500000000000000 |
| | 1100000000000000 |
| | — |
| F | 04F0000504000000 |
| | 1200000104001112 |

The carriage return code 33 is next read into registers KA, KB from the keyboard. This code is first read into the typewriter buffer byte DO, then into current character byte F7, and finally into the tape buffer at byte 02. The current tape buffer pointer in byte FE is incremented to 03.

| | 0123456789ABCDEF |
|---|---|
| 0 | 1530000000000000 |
| | 1130000000000000 |

As a result of decoding steps (box 312, FIG. 9) performed on the carriage return code 33, a subroutine is executed to write onto tape the stored contents of the tape buffer.

When the tape is played back, these stored codes are decoded (boxes 313 and 314, FIG. 10) and used to direct the operation of the typewriter in typing *ss* followed by a carriage return.

SINGLE TAPE EDITING

The editing typewriter of the invention provides the capability of editing material stored in a single record medium, specifically a single magnetic tape in a cassette, by recording corrected placement data over previously recorded data, as an alternative to the usual mode of editing that involves transferring recorded material from a first tape to a second tape. Thus, either the Transfer mode of editing or the single tape "Edit" mode may be selected by the operator, according to the nature of the changes to be made. Such capability is provided by modifying the procedures of recording material onto the tape and of reading the material from the tape. With such modifications, it is possible to replace portions of the recorded material or to insert new material, on a single tape, provided that each recorded line, with added material, contains no more than a predetermined number of characters. In the preferred embodiment described herein, the predetermined number is 100.

TAPE FORMATS

Referring now particularly to FIGS. 4 and 7, under the control of Control Logic 100, and in particular in response to the values of the *mop*, *kk* and *bi* fields of the prewired control words in read-only memory 104, the tape drives 236 and 238 and tape heads 240 and 246 are operated to record data onto tape 400 in one of tape casettes 232 or 234. Thus, for example, as shown in Table 9, a *mop* field value of B directs the transmission of data to tape 400 from the KA and KB registers 108 and 110, while values of *D* and *E* (in conjunction with values of the *KK* and *bi* fields) cause the tape drives and the recording current to be turned on or off, as specified in more detail in Table 15 and in the text at the section on "Control Logic".

Figure 11:
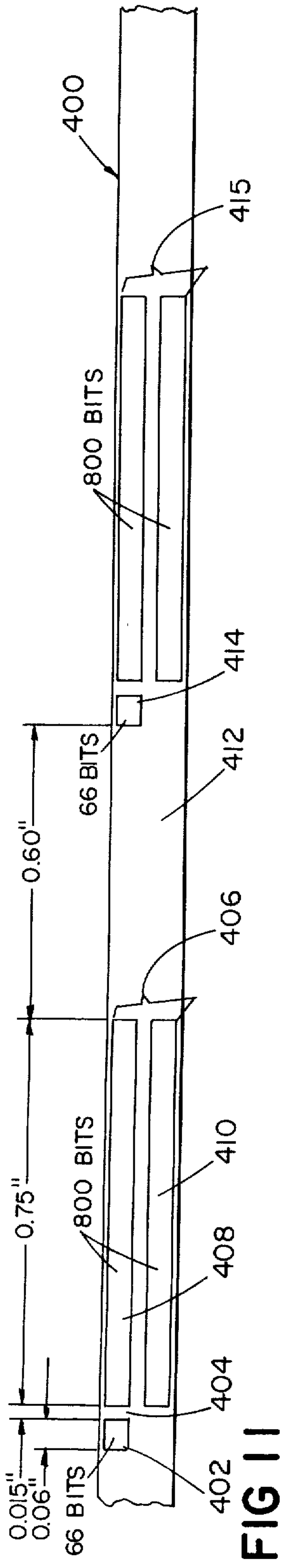
FIGS. 11 and 12 15 portions of the record medium.
Figure 12:
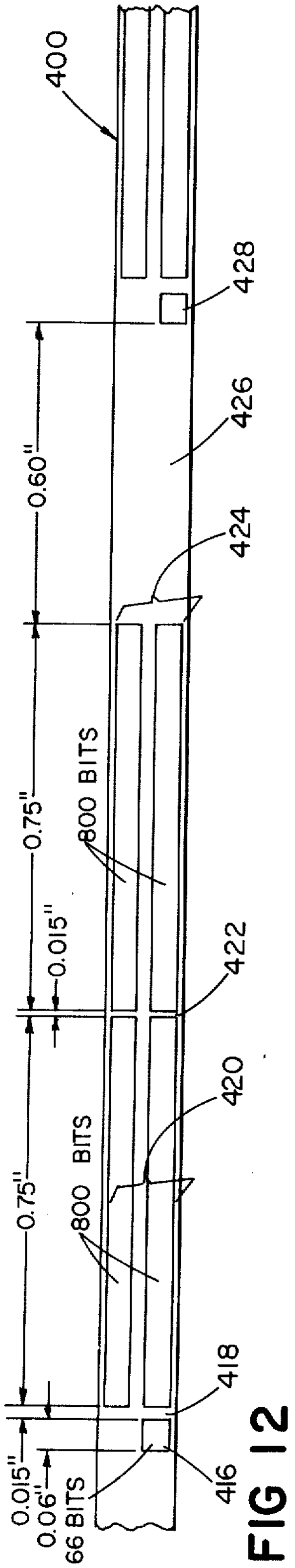

Referring now to FIGS. 11 and 12, information is recorded on tape 400 in either single or double block format. In single block format (FIG. 11), a short timing block 402 of 66 0 bits is followed by a 4 msec gap 404, and then by a 100-character information block 406 of 800 bits. The information is recorded on two tracks, the 0 track 408 and the 1 track 410, at a density of 1,067 bits per inch; the timing block is recorded on the 0 track. The codes are recorded serially on tape 400 (high order bit of each code first); the 1 bits are recorded by inverting the flux level of track 1, while the 0 bits are recorded by inverting the flux level of track 0. There are no parity bits nor any block check characters. A gap 412 of about 0.6 inch on the tape follows the information block before the next timing block 414 is recorded.

In double block format (FIG. 12), a short timing block 416 of 66 1 bits is recorded on the 1 track, followed by a 4 msec gap 418. A 100-character block 420 is then recorded as before, followed by a 2 msec gap 422 and a second 100-character block 424, identical with block 422. A gap 426 of about 0.6 inch occurs before the next timing block 428.

Single or double block format is determined by the setting of slide button 34 on keyboard 14 (FIG. 2).

Original Recording of Data

Figure 13:
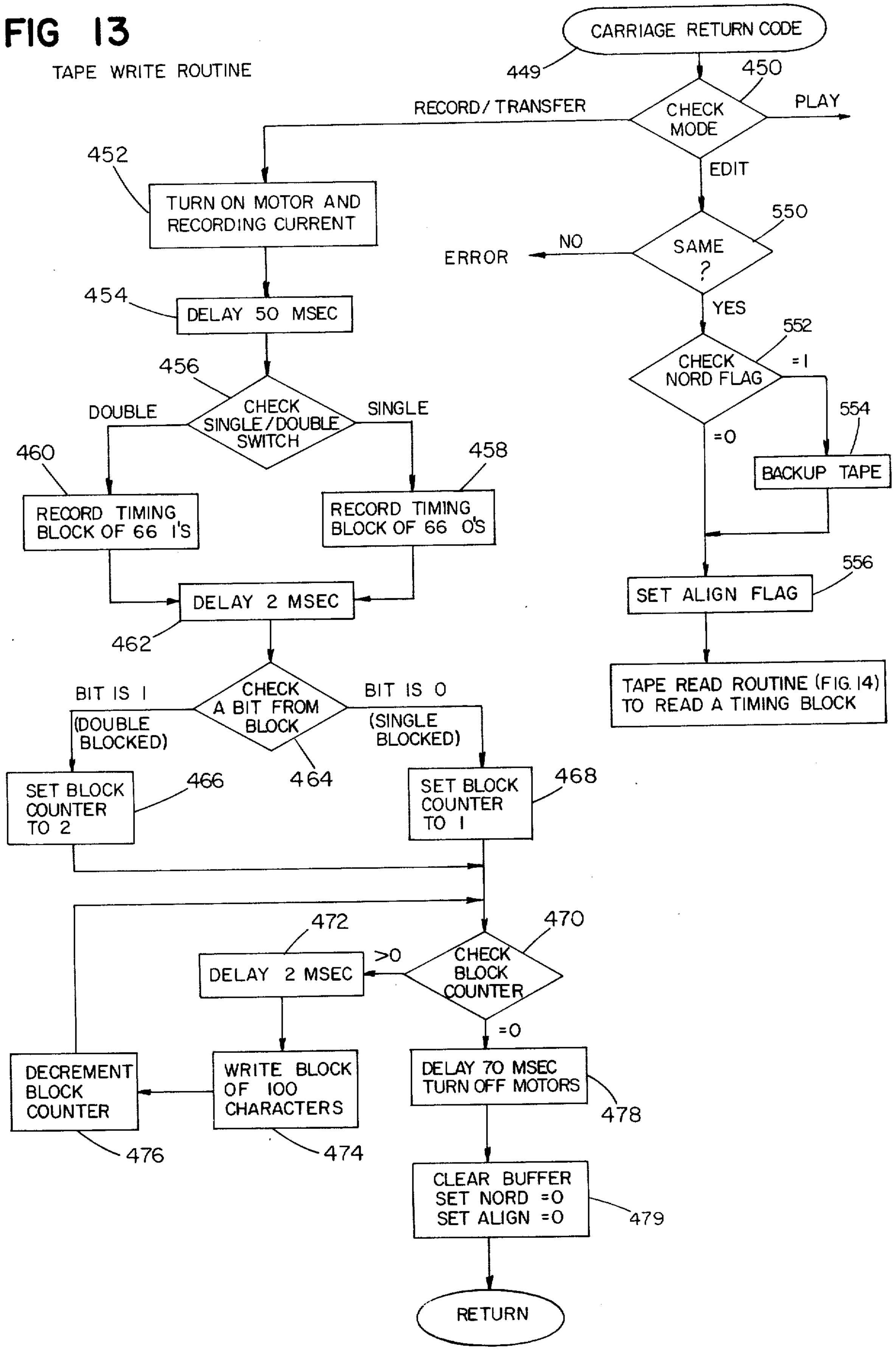

FIG. 13 shows schematically two branches of operations. The left branch shows the steps executed in writing on tape in Record/Transfer modes, as is described in this section. The right branch shows the steps executed in Edit mode, as will be explained below in the section "Recording Corrected Data".

In brief outline, and referring to FIG. 13, the recording of a block of data from buffer 230 (FIG. 8) onto tape 400 is accomplished in response to a Carriage Return code (33) sensed in Record, Transfer or Edit mode. In Record or Transfer mode, a timing block is first recorded, then a data block (or blocks in double block format); in Edit mode, a timing block is read and the data block is then recorded over a previously recorded data block.

The following steps are performed in the recording of data in the first instance:

Check mode: Record, Transfer, Edit or Play (FIG. 13, Step 450). The mode is indicated externally by the operator's depressing one of buttons 22, 24, 26 or 27 on keyboard 14 (FIG. 2) and internally by the setting of D1 Register 130 (FIG. 7) in response to such depression. As shown in Table 5 above, depressing Transfer button 22 (transfer mode signal means) cuases a transfer mode signal to be set into D2 Register 130; depressing Play button 24 causes a play mode signal to be set into D2; depressing Record button 26 (record mode signal means) causes a record mode signal to be set into D2; and depressing Edit button 27 (edit mode signal means) causes an edit mode signal to be set into D2. In Record or Transfer mode, to record a timing block (position signal):

Tape drive (236 or 238 in FIG. 4) is turned on with recording current to tape head 240 or 244 set to 0 on both tracks (Step 452).

Wait 50 msec (Step 454). During this time, the tape drive comes up to speed; the tape travels about ¼ inch in this interval.

Record 66 0 bits on track 0 (for single block recording) or 66 1 bits on track 1 (for double block recording) by reversing the appropriate flux level every 0.125 msec to provide a position signal (Steps 456, 458, 460). There is no functional significance to the number 66, which has been arbitrarily selected. Similarly, there is no significance to the choice of 0 's and 1 's to represent single and double block formats. Any two distinguishable bit patterns would be equally satisfactory. To record a data block:

Wait 2 msec (Step 462). This delay provides the first part of the 4 msec gap 404 or 418 (FIGS. 11 and 12). Check a bit from the timing block (to determine whether it = 0 or 1) and set block counter accordingly to 1 or 2 (Steps 464, 466, 468). (These steps are accomplished in a few microseconds and do not significantly add to the 2 msec delay.)

Check the block counter (Step 470). Wait 2 msed (this completes the 4 msec gap 404 or 418); record a set of data signals comprising block of 100 characters (Steps 472 and 474). The content of the tape buffer 230, up to 100 characters, representing a line of printing signals, is written on the tape; if there are fewer than 100 characters, the block is filled with tape pad codes (AA) to make up a 100 character block. The left tape is written if the editing typewriter is in Transfer mode, the tape selected by button 18 or 20 (FIG. 2) is written if the editing typewriter is in Record mode.

Decrement the block counter (Step 476); if the block counter is not zero, write the second data block (as at 424 in FIG. 12) in double block format and decrement the block counter again. When the block counter = 0, delay 70 msec and turn off tape drive motor (Steps 470 and 478). Clear buffer 230 and reset NORD and ALIGN flags to zero (Step 479). (The significance of these flags will be explained in what follows.)

Reading Data From Tape

Figure 14:
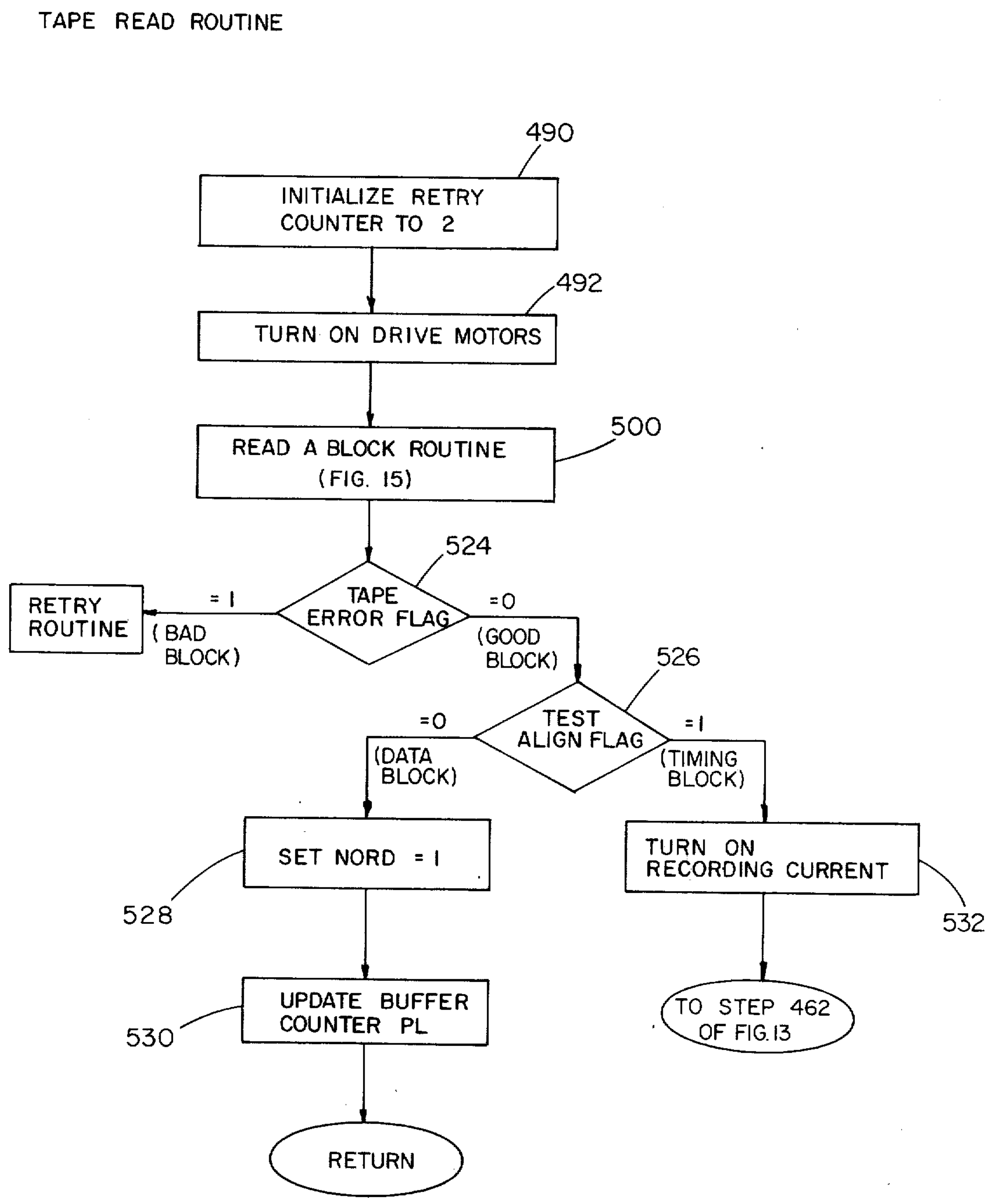
Figure 15:
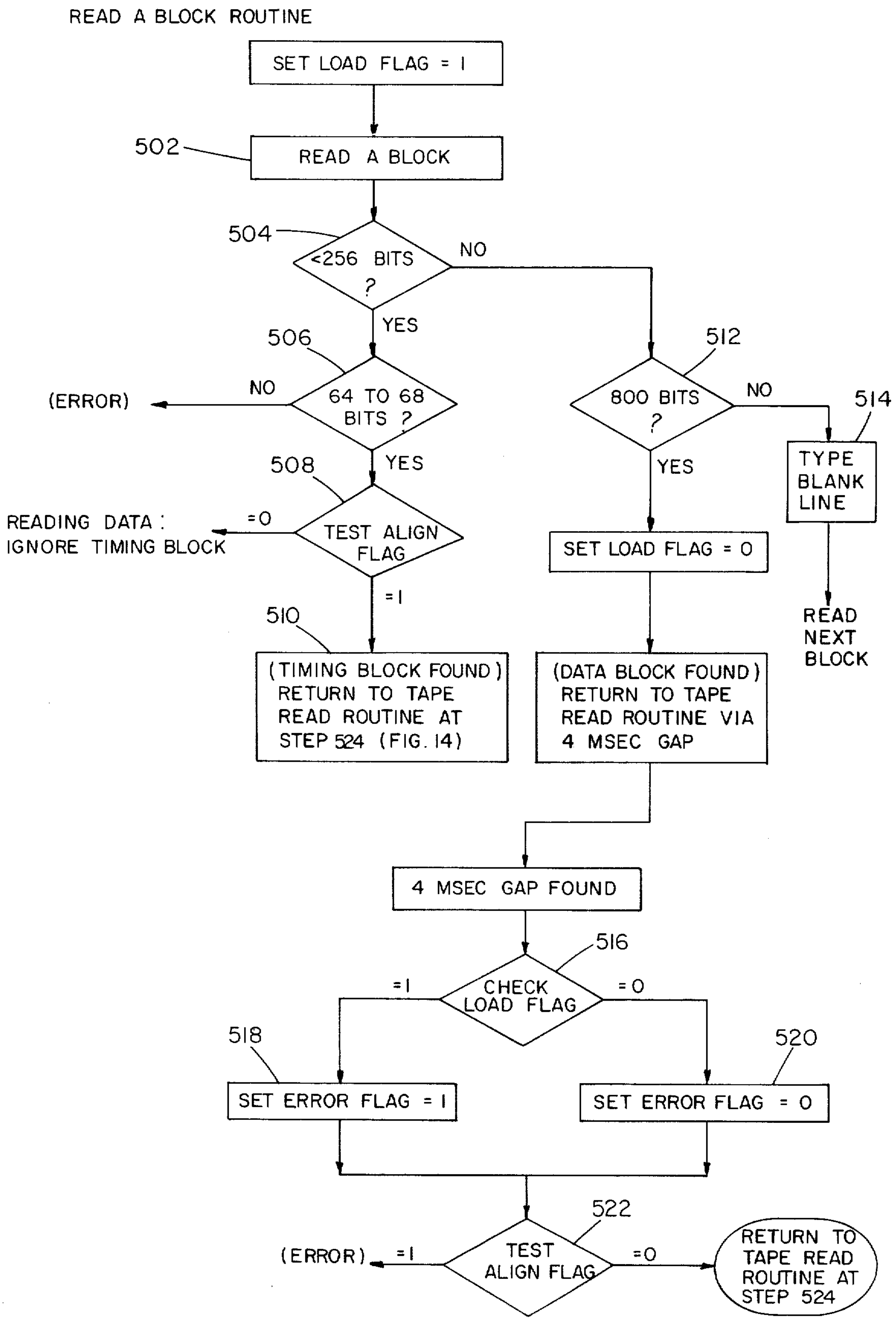

The operations involved in reading data from the tape are schematically shown in FIG. 14 (TAPE READ ROUTINE) and in FIG. 15 (READ A BLOCK ROUTINE). FIG. 15 corresponds to step 500 in FIG. 14. When the operations of FIG. 15 have been completed, the TAPE READ ROUTINE is continued from step 524.

In the particular method of carrying out the invention that is described herein, many of the operations shown in FIGS. 14 and 15 are used for either of two different purposes. These steps may be executed in order to read a set of data signals (800bits) into tape buffer 230 (FIG. 8) for the purpose of editing the block, alternatively, many of the same steps may be executed in order to read a position signal (66 bits) for the purpose of positioning the tape head for rerecording a replacement set of signals, as will be explained below ("Recording Corrected Data"). Thus, during the usual course of reading in 800-bit data blocks, it is desired to ignore timing blocks, while during recording in EDIT mode, it is desired to make use of the timing block and a data block is not wanted. It is therefore necessary throughout the execution of these steps to keep track of the purpose for which the data reading operations are being carried out.

In order to distinguish between these two situations during the execution of the steps shown in FIGS. 14 and 15, a bit in byte EE of memory 106, termed the "ALIGN" flag, is set = 1 at the beginning of the operation of writing a block onto tape in EDIT mode, as will be explained below ("Recording Corrected Data"). (This step is shown as step 556 on FIG. 13.) This flag is otherwise = 0. The use of this flag is thus required in the particular mode of carrying out the invention that is described herein, but is not essential to the invention in its broad aspect.

The reading operations will now be explained in brief outline, followed by a more detailed explanation including reference to the relevant prewired control words in Read-only memory 104.

Brief Outline

Referring now to FIGS. 14 and 15, the steps executed in reading from the tape will be briefly summarized.

The "Retry Counter" in byte EF of memory 106 is initialized to 2 (Step 490, FIG. 14); this counter is referred to when a bad block of data is read and a decision must be made whether to attempt to reread it. This operation is not part of the present invention and will not be described in detail. The tape drive motors are turned on (step 492 of FIG. 14).

FIG. 15 shows schematically the operations involved in the READ A BLOCK ROUTINE (Step 500 of FIG. 14).

Step 502: Read a Block

Data is read into temporary storage means (memory 106) from the tape one bit at a time until a block is completed (step 502 in FIG. 15). In the operation of the editing typewriter of the invention, the beginning of a block is defined as the reading of 8 consecutive bits (one byte), each bit within 0.5 msec of the previous bit; the end of a block is defined as occurring when no bit is read within 0.5 msec of a previous bit. Since bits are recorded at intervals of 0.125 msec, this factor of 4 allows bits to be read even if the tape is moving at only one-quarter of its normal speed.

A timer is employed to detect a 0.5 msec gap; this timer is a register in Central Processor 102 whose contents are initialized to 0.5 msec after a bit is read and decremented at regular intervals so long as no bits are read. When the timer is found to be exhausted, the 0.5 msec gap is considered to have been detected.

Bits are read from the tape one at a time into KA and KB registers 108 and 110 (FIG. 7). The bits are assembled into an 8-bit byte in the current character byte F7 of memory 106 (FIG. 8); the completed byte is transferred to buffer 230. A bit counter in T Register 112 (FIG. 7) is incremented by 2 each time a bit is read; after 8 bits, this counter reaches a value of 16 (or hexidecimal 0 in a 4 bit register) which may be conveniently tested to determine that 8 bits have been read. Each byte as assembled in byte F7 is then read into buffer 230 at a location whose address is kept in UV Registers 114 and 116 (FIG. 7). At the beginning of a block, the contents of UV are set equal to the value of buffer counter PL in byte FF of memory 106. When the end of a block has been reached, as determined by the exhaustion of the 0.5 msec timer, the value of counter PL (which has not yet been incremented) is subtracted from the contents of UV registers 114 and 116 to provide the number of 8-bit bytes that have been read, the T Register 112 contains the number of additional bits, and the sum of these numbers is the total number of bits in the block that has been read. At the end of each block, this count is tested.

Steps 504 — 514 of FIG. 15

When a 0.5 msec gap has been detected, signalling the end of a block, the total bit count as determined above is tested. The count is initially tested to determine when fewer than 256 bits have been read (Step 504). This determines a branch between steps appropriate to a timing block (left branch of FIG. 15) and steps appropriate to a data block (right branch).

If fewer than 256 bits have been read, the count is tested to determine whether 64–68 bits have been read (Step 506). If the bit count is not between 64 and 68, the block of data is considered to be bad, and an error routine will be executed, in which the NO ADJUST, END OF DOCUMENT, CHARACTER/STOP and RECORD lights (52, 54, 62 and 30 on FIG. 2) flash repeatedly and the typewriter bell rings to alert the operator. If the bit count is 64–68, a timing block (position signal) has been found. The ALIGN flag, whose setting has been mentioned above, is next tested (step 508) to determine whether a timing block is being looked for. If the ALIGN flag = 0, a timing block is not being looked for; when the next data block is read, the timing block will be ignored, so that the block (presumably an 800-bit data block) will be read into tape buffer 230 in place of the timing block. If the ALIGN flag = 1, a timing block is being looked for during the procedure of writing a corrected block onto tape, and step 524 in FIG. 14 is executed next to accomplish this writing operation.

If more than 256 bits have been read, the count is tested (step 512) to determine whether 800 bits have been read. If 800 bits were read, a data block (set of data signals) has been found; the "LOAD FLAG" (in Status Register 128), set to 1 before the block was read is set = 0 to prevent the reading of a redundant block of data into buffer 230 and the next steps to be executed lead back to the TAPE READ ROUTINE. If the count is greater than 256 but not equal to 800 bits, there is an error, and the machine will type a blank line (Step 514) and attempt to read the next block.

Return to TAPE READ ROUTINE (FIG. 14)

When either a looked-for timing block or looked-for data block has been successfully read, step 524 in FIG. 14 is next executed. The tape error flag will be zero if a good block (either a 800-bit data block or a timing block) has been read; if the error flag is zero, the ALIGN flag is tested (step 526) to determine whether a timing block or data block has been read. If a 800-bit data block has been read (left branch), the NORD flag (record medium backup indicator) is set = 1 (step 528). The use of this flag will be explained in what follows ("Recording Corrected Data"). The buffer counter PL (in byte FF of memory 106) is updated to point to the end of the data block just read in (step 530). The operator may now edit the line that has been read into the buffer, using the operations of deletion, typing correct letters over incorrect ones, skipping portions of the line or inserting new portions, to provide a replacement line of printing signals in the buffer.

If a timing block has been read (right branch), it is used as will be explained under "Recording Corrected Data" in the operations of recording a new block in place of an old one.

Reading Data from Tape — Detailed Discussion

The steps that have been briefly reviewed with reference to FIGS. 14 and 15 are the result of the execution of selected pre-wired control words in Read-Only Memory 104 (FIG. 4). Since under the earlier section on "Underlining" the selection and execution of a series of pre-wired control words, and the operation in response thereto of the typewriter system by appropriate means in Control Logic 100, have been explained in detail by way of example, the detailed interpretation of these words will not be given. Tables 6 (A-bus Input and Z-bus output), 7 (B-bus input), 8 (Arithmetic operations), 9 (Memory operations), 10 (External indicator), 11 (External controls), 12 (Tape input), 13 (Tape output), 14 (Device status input), 15 (Tape motor on and off controls), 16 (Status field), 18 (Jump address fields), with the relevant text under the section "Control Logic" above, and the Figures, particularly FIG. 6 showing the format of the pre-wired control words, may be referred to for details of the execution of particular control words and the operation of the system by appropriate means in Control Logic 100 in response thereto.

Referring now to FIG. 15, when a 0.5 msec gap has been detected, signalling the end of a block (in step 502), the total bit count as determined above is tested. The following sequence of pre-wired control words (step 504 in FIG. 202) is executed by the central processor 102 to determine whether fewer than 256 bits have been read. (The number 256 was selected for convenience in arithmetic using binary notation, but also is of the order of magnitude of the number of bits in damaged blocks that are found in practice to occur).

```
(3990) 3 7 5 2 1 1 6 F 1 0 0FD 3 2
(3991) 2 6 6 3 1 1 0 0 0 0 0FD 0 1
(3989) 5 1 7 6 1 1 0 4 0 0 0FE 0 1
(3997) 6 1 4 6 1 1 0 6 0 0 1AC 1 1
(4013) 4 7 7 6 1 0 0 0 0 0 ———
(4014) 6 1 0 0 1 0 0 E 0 0 1CB 0 5
```

If fewer than 256 bits have been read in the block, the bit count is next tested by the execution of the following sequence of control words (step 506) to determine whether the bit count is between 64 to 68:

```
(4017) 1 1 1 5 1 0 0 8 5 0 1AD 0 1
(4033) 1 6 0 6 1 0 0 0 5 0 048 0 4
(1327) 5 1 0 6 1 1 0 8 0 0 048 7 0
```

If the bit count is not 64 to 68, a bad block of data has been read, and execution of control word 1326 causes a branch to appropriate error operations, not relevant here.

(1326) 0 0 0 0 0 0 0 0 0 0 149 1 1

If a block of 64 to 68 bits has been read, control words 1328 and 1329 are executed (step 508) to test the value of the ALIGN flag, whose setting has been referred to.

```
(1328) 0 1 3 0 0 0 5 E 1 0 048 1 2
(1329) 6 1 0 5 1 0 0 4 0 0 177 0 4
```

If the ALIGN flag is found to bo 0, then a timing block (position signal) has been found at a time when a data block (set of data signals) was being looked for; the timing block will be ignored and the next block on the tape will be read into the buffer over the timing block.

If the ALIGN flag is found to be 1, however, execution of statement 4030

(4030) 0 0 0 0 0 0 0 0 8 0 1B0 1 1 causes a branch (step 510) back to the operation of writing onto the tape in EDIT mode, which will be explained in more detail in what follows in the section "Recording Corrected Data".

If more than 256 bits have been read in the block, execution of statement 4018 (step 512)

(4018) 1 7 0 6 1 0 6 F 0 0 176 1 4 determines whether the block contained 800 bits. If 800 bits were read, a flag ("LOAD FLAG") in location S3 of Status Register 128 is set = 0 to prevent reading in the second block of a double block format. A 4 msec gap is then looked for.

If the block contained more than 256 bits but not 800 bits, the block is ignored and the next block on the tape is read. Operations are performed (step 514) that result in the editing typewriter typing out a blank line, which may later be filled in manually by the operator if desired. These operations are not relevant to the present invention and will not be described in detail.

After a 4 msec gap has been detected, following an 800 bit block, statement 3895 is executed (step 516, FIG. 15)

(3985) 0 0 0 0 0 0 6 6 0 0 0FE3 3 to test the load flag in S-Register 128. If the load flag is 0, the error flag is set = 0; if the load flag is 1, the error flag is set = 1 (steps 518 and 520). In either case, statements 4062 and 4064 are next executed to test the ALIGN flag (step 522).

```
(4062) 0 1 3 0 0 0 5 E 1 0 1E6 0 2
(4064) 6 1 0 5 1 0 0 4 0 0 1E6 1 4
```

If the ALIGN flag is found to be = 0, then a data block (set of data signals) has been read when it was looked for and control returns to the tape reading routine at step 524 (FIG. 14). If the ALIGN flag = 1, a data block has been read when a timing block (position signal) was being looked for. The machine will stop, the lights will flash as previously described and the operator must intervene.

At the completion of the READ A BLOCK ROUTINE, return is always to step 524 of FIG. 14. The tape error flag is tested. If this flag = 1, another attempt is made to read the same block; these operations will not be explained in detail. If this flag = 0, the ALIGN flag is next tested (statement 1302) to determine why the last block was read (step 526).

(1302) 6 1 0 5 1 0 0 4 0 0 14E 1 4

If ALIGN = 0, this is a normal tape read routine, the NORD flag (explained below) is set = 1 (step 528, statement 1307) and the buffer counter is updated to the end of the data block just read in (step 530).

(1307) 0 0 6 1 0 0 2 E 0 0 0E9 1 1

If ALIGN = 1, a timing block was looked for and has been found, and the recording current is turned on (step 532) after which step 462 of FIG. 13 is executed together with the remainder of the TAPE WRITE ROUTINE.

Recording Corrected Data

There are two possible cases. In the first, a first set of data signals previously recorded on tape and providing a line of printing symbols is selected by the operator. The operator uses either Search key 68 or Line Back key 42 on keyboard 14 (FIG. 2) to provide a line selection signal, in response to which a particular line is read into the buffer as explained above. The line is then edited by the operator to provide a replacement line. The replacement line is then to be recorded in place of the line already read; this involves backing up the tape one data block. In the second case, the operator continues on to replace the next line, which has not been read into the buffer; the tape therefore does not need to be backed up before the new line is recorded. The decision between the two modes of operation is made based on the value of a record medium backup indicator, which is the "NORD" flag in byte EE of memory 106.

Tne "NORD" flag is set = 1 (first value) every time a block of data is read into the buffer (step 528 of FIG. 14); it is set = 0 (second value) every time a block is written (step 79 of FIG. 13).

Figure 16:
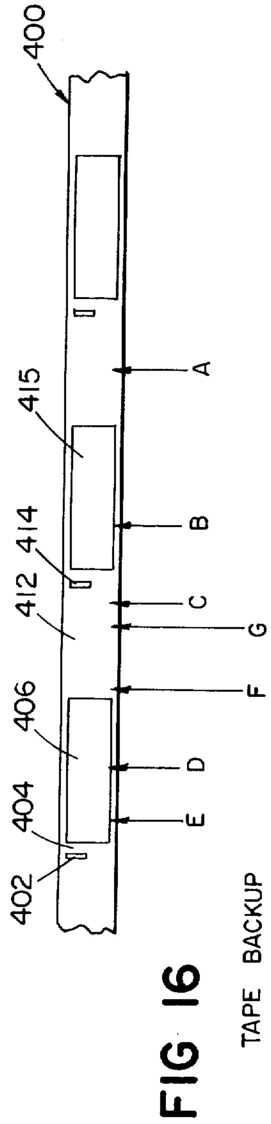
FIG.16 shows schematically the operation of backing up the record medium.

The procedure for backing up the tape one block is shown schematically in FIG. 16 for a single block format tape 400. The record head is initially at position A, in the large gap (about 0.6 inch) between two blocks. The tape drive motor is turned on, in reverse, and runs for 100 msec, bringing the record head into position B with respect to the tape. At the end of the 100 msec, the tape drive motor continues to run and bits are read until a 4 msec gap is detected. This is accomplished by setting a timer (comprising a register in memory 106) to 4 msec after a bit is read and decrementing the timer at regular intervals if no bits are read into K*a* and K*b* registers 108 and 110. If the timer becomes exhausted, a 4 msec gap is defined as having been found. Such a gap is found when the record head is at approximately position C. The 4 msec gap between timing block 414 and data block 415 might equally well be found; the procedure is not affected by which gap is found. After the 4 msec gap is found, the tape drive motor continues in reverse for another 100 msec, bringing the record head to approximately position D with respect to tape 400; at this time the motor is turned off and 60 msec are allowed for the tape to come to a stop, which occurs when the record head is in position E with respect to tape 400. The motor is then turned on in the forward direction for 60 msec while the motor comes up to speed. After the 60 msec delay, another 4 msec gap is looked for as described above, and is detected when the record head is in approximately position F with respect to tape 400. The motor is then turned off and the tape coasts to a stop, coming to rest with the record head in approximately position G with respect to the tape, or approximately in the middle of the large gap between data blocks.

The operations involved in writing onto the tape are schematically shown in FIGS. 13, 14, 15 and 16.

When the operator wishes to record a replacement line on the tape 400 he depresses Carriage Return key 214 on keyboard 16, to generate a Carriage Return code 33 (step 449 of FIG. 13). As in the operation explained above under "Original Recording of Data", in response to this code, the mode is first checked (step 450). As the mode is found to be Edit (rather than Play, Transfer or Record), the procedure of recording a timing block (position signal) is not carried out, while the following steps are performed instead:

Check to make sure the Same key 46 (FIG. 2) is depressed, not Adjust key 48 or Justify key 50. Editing may be performed only in Same mode (step 550).

Check NORD flag in byte EE of memory 106 (step 552).

If NORD = 1 (first value), back up tape 1 block (step 554). As explained above with reference to FIG. 16, this includes the timing block; that is, after backing up the tape 1 block, the tape head 240 or 244 (FIG. 4) is in the 100 msec gap 426 or 412 (FIGS. 11 and 12).

If NORD = 0 (second value), or after backing up the tape 1 block, set ALIGN flag = 1 (step 556 of FIG. 13). This is an indication that a timing block is being looked for. Start tape forward and read a timing block, as explained above under "Reading Data from Tape".

Proceed from there as in the ordinary recording procedure. It is immaterial to the remainder of the recording routine whether the timing block (position signal) has just been recorded or was previously recorded and has just been read from the tape. The data block, or blocks (set of Data signals) will follow on the tape in precise timing and position relationship after the position signal.

In reading the timing block in Edit mode, an additional 0.5 msec delay is introduced because of the way in which the end of a block is defined. The 4 msec delay cannot begin until after this 0.5 msec gap. Hence the replacement data block will be slightly displaced with respect to the original data block. However, as the record current is on, although no bits are being written, during the 4 msec delay, the initial bits of the original block will be erased and no error will result. The replacement block will be precisely located with respect to the timing block, insuring that the replacement block is reliably spaced from the next timing and data blocks and preventing damage to such blocks.

After a data block has beeen recorded, the buffer is cleared. The NORD flag in bytes EE is set to 0 and the routine is completed.

TRANSFER MODE EDITING

Editing in the Transfer mode is accomplished in the conventional manner, by transferring portions recorded on a first tape to a second tape and skipping portions or inserting additional portions as desired. The transfer operation is carried out in response to depression of Transfer button 22 (transfer mode signal means) on keyboard 14 (FIG. 2). In this operation, data blocks are read from a first tape, using the TAPE READ ROUTINE as previously described, into buffer 230. The data blocks are then recorded onto a second tape from buffer 230, each data block (set of data signals) being proceded by a timing block (position signal), as explained above in the discussion of the TAPE WRITE ROUTINE. Material on the first tape may be skipped, if desired, using the Skip key 70 together with the Paragraph, Line, Word and Character keys 56, 58, 60 and 62. When it is desired to insert new material, the new material is typed on the keyboard in the usual manner, and is recorded onto the second tape with position signals as previously explained. The combination of these operations provides the capability of editing in the conventional Transfer or two-record- medium mode, as an alternative, selectable by the operator, to the Edit or single-record-medium mode.

What is claimed is:

1. An editing typewriter system comprising a keyboard with a plurality of symbol printing keys providing alpha-numeric printing signals, record mode signal means providing a record mode signal, and edit mode signal means providing an edit mode signal, type means having a plurality of alpha-numeric printing symbols corresponding to said symbol printing keys, said type means being operable in response to said printing signals to print selected said symbols in a line, control logic connected to said keyboard means and including temporary storage means for storing said printing signals, a record unit connected to said control logic and comprising drive means responsive to said control logic for moving a record medium in forward and reverse directions, recording means responsive to said control logic for recording signals on a record medium from said temporary storage medium, and reading means responsive to said control logic for reading signals from a record medium into said temporary storage means, said control logic including means responsive to said record mode signal to operate said drive means and said recording means to record onto the record medium a position signal and a first set of data signals in precise relationship, said first set of data signals providing a said line of printing signals, said control logic further including means responsive to said edit mode signal to operate said drive means and said reading means to read a previously recorded position signal from the record medium, and means responsive to said edit mode signal and the reading of said previously recorded position signal while said drive means continues to be operated to operate said recording means to record onto the record medium a replacement set of signals to provide a replacement line of printing signals, superimposed on said first set of data signals, said previously recorded position signal and said replacement set of data signals being recorded on said record medium in said precise relationship.

2. The typewriter system of claim 1, said keyboard further having line selection signal means providing a line selection signal, and said control logic further including record medium backup indicator means, means responsive to said line selection signal to operate said drive means and said reading means to select and reads a recorded said line of printing signals into said temporary storage means, means responsive to the completion of said reading to set said record medium backup indicator means to a first value, means responsive to said edit mode signal and said symbol printing keys to alter said line of printing signals in said temporary storage means to provide a said replacement line, means responsive to said edit mode signal and said record medium backup indicator means first value to operate said drive means to move the record medium in said reverse direction and to position said recording and reading means in advance of said recorded line of printing signals and in advance of the previously recorded position signal immediately preceding said recorded line, before operating said drive means and said reading and recording means to read said position signal and to record said replacement line onto the record medium, means responsive to completion of recording of any set of signals providing a said line to set said record medium backup indicator means to a second value, and means responsive to said edit mode signal and said record medium backup indicator means second value continuously to operate said drive means to move the record medium in said forward direction and to operate said recording means to read the next succeeding said position signal and in response to the reading of said next succeeding position signal to operate said recording means to record a said replacement line onto the record medium.

3. The editing typewriter system of claim 1 wherein said control logic means responsive to said record mode signal operates said drive means and said record means to record onto the record medium a first set of a predetermined number of data signals, and said control logic means responsive to said edit mode signal and said reading of said previously recorded position signal operates said recording means to record onto the record medium a replacement set of said predetermined number of signals, superimposed on said first set of data signals.

4. The editing typewriter system of claim 1 wherein said record unit is adapted to receive a magnetic tape in a removable cassette, and said drive means is responsive to said control logic to move a magnetic tape in a removable cassette in forward and reverse directions, and said recording means and reading means are responsive to said control logic to read from and record on a magnetic tape in a removable cassette. .

5. The editing typewriter system of claim 1, wherein said position signal comprises a set of a predetermined number of signals and said control logic means responsive to said edit mode signal and the reading of said previously recorded position signal includes means responsive to said predetermined number of signals to identify a said position signal.

6. The editing typewriter system of claim 1, wherein said control logic means responsive to said record mode signal operates said drive means and said recording means to record onto the record medium a position signal, and after a predetermined interval of time after recording said position signal while said drive means continues to be operated operates said recording means to record onto the record medium said first set of data signals, and said control logic means responsive to said edit mode signal and the reading of said previously recorded position signal while said drive means continues to be operated operates said recording means after a predetermined interval of time after reading said position signal to record onto the record medium said replacement set of signals superimposed over said first set of data signals.

7. The editing typewriter system of claim 1 wherein said keyboard further includes record medium format selection means for selecting one of a plurality of record medium data signal formats and providing a corresponding format selection signal said control logic means responsive to said record mode signal being further responsive to said corresponding format selection signal to operate said drive means and said recording means to record on said record medium a position signal including information representing said corresponding format selection signal, and responsive to said position signal included information to record onto the record medium sets of data signals in a format selected by said format selection means, said control logic means responsive to said edit mode signal being further responsive to said position signal included information to record onto the record medium sets of replacement signals in a format selected by said format selection means.

8. An editing typewriter system selectively operable to provide an edited record in a first mode employing two record mediums and a second mode employing a single record medium, comprising a keyboard with a plurality of symbol printing keys providing alpha-numeric printing signals, a record mode signal means providing a record mode signal, edit mode signal means providing an edit mode signal, and transfer mode signal means providing a transfer mode signal, type means having a plurality of alpha-numeric printing symbols corresponding to said symbol printing keys, said type means being operable in response to said printing signals to print selected said symbols in a line, control logic connected to said keyboard means and including temporary storage means for storing said printing signals, a record unit for receiving two record mediums, said record unit being connected to said control logic and comprising drive means responsive to said control logic for moving at least one record medium in forward and reverse directions, recording means responsive to said control logic for recording signals on a record medium from said temporary storage means, and reading means responsive to said control logic for reading signals from a record medium into said temporary storage means, said control logic including means responsive to said record mode signal to operate said drive means and said recording means to record onto a record medium a position signal and a first set of data signals in precise relationship, said first set of data signals providing a said line of printing signals, said control logic further including means responsive to said edit mode signal to operate said drive means and said reading means to read a previously recorded position signal from a record medium, and means responsive to said edit mode signal and the reading of said previously recorded position signal while said drive means continues to be operated to operate said recording means to record onto that record medium a replacement set of signals to provide a replacement line of printing signals, superimposed on said first set of data signals, said previously recorded position signal and said replacement set of data signals being recorded on the record medium in precise relationship, said control means further including means responsive to said transfer mode signal to operate said drive means, said reading means and said recording means to read a said set of data signals from a first record medium and to record on to the second record medium a said position signal and said set of data signals in precise relationship.

9. An editing typewriter system using a record medium and including record mode signal means providing a record mode signal, edit mode signal means providing an edit mode signal, control logic including means responsive to said record mode signal to records onto a record medium a position signal and a first set of data signals in precise relationship, means responsive to said edit mode signal to read a previously recorded position signal from the record medium, and means responsive to said edit mode signal and the reading of said previously recorded position signal to record onto the record medium a replacement set of data signals superimposed on said first set of data signals, said previously recorded position signal and said replacement set of data signals being recorded on the record medium in precise relationship.

* * * * *

UNITED STATES PATENT AND TRADEMARK OFFICE
CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers or combinations of letters and numbers appearing throughout the patent are not reference numerals, do not refer to any element in the drawings, and should not appear in boldface type:

| Column | Line | Word or Alphanumeric |
|---|---|---|
| 7 | 14 | 100 |
| 7 | 19 | 100 |
| 7 | 20 | 100 |
| 7 | 31 | 100 |
| 11 | 10 | 9 |
| 11 | 37 | ø |
| 13 | 30 | 1973 |
| 14 | 62 | 13 |
| 17 | 46 | 1 |
| 17 | 47 | 1 |
| 17 | 48 | 1 |
| 17 | 49 | 1 |
| 17 | 65 | 1 |
| 17 | 66 | 1 |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers or combinations of letters and numbers appearing throughout the patent are not reference numerals, do not refer to any element in the drawings, and should not appear in boldface type:

| Column | Line | Word or Alphanumeric |
|---|---|---|
| 17 | 67 | 1 |
| 18 | 1 | 1 |
| 19 | 53 | 16 |
| 20 | 3 | 3 |
| 20 | 23 | 66 |
| 20 | 24 | 42 |
| 21 | 26 | PL-1 |
| 21 | 40 | 66 |
| 21 | 43 | 66, 50 |
| 21 | 44 | 50 |
| 22 | 57 | 11, 11, 13, 80, 33 |
| 24 | 48 | D |
| 24 | 66 | 4 |
| 26 | 28 | 4358 |
| 26 | 30 | 63,99 |
| 26 | 41 | PL-1 |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers or combinations of letters and numbers appearing throughout the patent are not reference numerals, do not refer to any element in the drawings, and should not appear in boldface type:

| Column | Line | Word or Alphanumeric |
|---|---|---|
| 26 | 63 | 59, 89 |
| 31 | 17 | 66 |
| 31 | 18 | 100 |
| 31 | 31 | 66 |
| 31 | 34 | 100 |
| 31 | 35 | 0.6 |
| 32 | 12 | 66 |
| 32 | 13 | 66 |
| 32 | 16 | 66 |
| 32 | 23 | 4 |
| 32 | 26 | 1, 2 |
| 33 | 28 | 2 |
| 33 | 58 | 8 |
| 34 | 23 | 64, 68 |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers or combinations of letters and numbers appearing throughout the patent are not reference numerals, do not refer to any element in the drawings, and should not appear in boldface type:

| Column | Line | Word or Alphanumeric |
|---|---|---|
| 35 | 39 | 256 |
| 35 | 40 | 256 |
| 35 | 61 | 64, 68 |
| 38 | 49 | 4 |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following letters appearing throughout the patent should not appear in italic type:

| Column | Line | Word |
|---|---|---|
| 9 | 17 | u |
| 15 | 6-7 | ai, bi, zo, aop, ac, bc, mop, kk, stat, sub |
| 15 | 8 | jad, jh, jl |
| 22 | 21 | aop, bc |
| 22 | 25 | mop |
| 23 | 21 | jh |
| 23 | 44 | ai |
| 23 | 45 | zo, aop, ac |
| 24 | 50 | jl |
| 26 | 34 | jl |
| 28 | 29-30 | ai, ac, stat |
| 31 | 9 | D, E |
| 37 | 51 | Ka, Kb |

CERTIFICATE OF CORRECTION

PATENT NO. : 3,913,721

DATED : October 21, 1975

INVENTOR(S) : Harold Stanley Koplow, et al.

It is certified that error appears in the above-identified patent and that said Letters Patent are hereby corrected as shown below:

The following numbers appearing throughout the patent are reference numerals and should appear in boldface type:

| Column | Line | Number |
|---|---|---|
| 13 | 57 | 114 |
| 18 | 62 | 184, 186 |
| 22 | 4 | 100 |
| 39 | 9 | 60 |

UNITED STATES PATENT AND TRADEMARK OFFICE
CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following letters and words appearing throughout the patent should appear in italic type:

| Column | Line | Word or Alphanumeric |
|---|---|---|
| 5 | 39 | in, out |
| 5 | 40 | in, out |
| 6 | 47 | Auto Start |
| 6 | 48 | Memo (Out) |
| 6 | 50 | memo |
| 6 | 51 | Search |
| 6 | 53 | Skip |
| 7 | 39 | Xx |
| 11 | 13 | space (second occurrence) |
| 11 | 15 | required space |
| 11 | 20 | required hyphen |
| 11 | 24 | required |
| 11 | 25 | ?/ |
| 11 | 26 | end of document |
| 11 | 28 | Gg |
| 11 | 29 | stop |
| 11 | 32 | required backspace |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following letters and words appearing throughout the patent should appear in italic type:

| Column | Line | Word or Alphanumeric |
|---|---|---|
| 11 | 34 | ordinary backspace |
| 11 | 42 | rewind and stop |
| 11 | 43 | Ww |
| 11 | 47-48 | center line |
| 11 | 49 | Oo |
| 11 | 52 | memo in |
| 11 | 53 | Mm |
| 11 | 55-56 | required tab |
| 11 | 57 | tab |
| 11 | 62 | Bb |
| 11 | 63 | write formal block |
| 11 | 65 | learn |
| 11 | 66 | Ll |
| 12 | 7 | delete |
| 12 | 8 | Xx |
| 12 | 12 | required carrier return |
| 12 | 14 | return |

UNITED STATES PATENT AND TRADEMARK OFFICE

CERTIFICATE OF CORRECTION

PATENT NO. : 3,913,721

DATED : October 21, 1975
INVENTOR(S) : Harold Stanley Koplow et al.

It is certified that error appears in the above–identified patent and that said Letters Patent are hereby corrected as shown below:

The following letters and words appearing throughout the patent should appear in italic type:

| Column | Line | Word or Alphanumeric |
|---|---|---|
| 12 | 23 | rewind |
| 12 | 25 | switch read |
| 12 | 33-34 | read format block |
| 12 | 35 | read memo block |
| 12 | 37 | block link |
| 12 | 39 | Line Back |
| 12 | 40 | Line Back |
| 12 | 42 | Play, Line Back |
| 12 | 45 | Record |
| 12 | 48 | Transfer |
| 12 | 49 | left |
| 12 | 51 | already typed |
| 12 | 53 | set tab |
| 14 | 5 | stat |
| 15 | 39 | zo |
| Table 8 | 19 | bc |
| Table 8 | 21 | bc |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following letters and words appearing throughout the patent should appear in italic type:

| Column | Line | Word or Alphanumeric |
|---|---|---|
| Table 9 | 19 | kk |
| Table 9 | 25 | KK |
| Table 9 | 30 | kk, bi |
| Table 9 | 32 | kk, bi |
| Table 9 | 37 | kk |
| Table 9 | 40 | kk |
| Table 9 | 43 | kk |
| Table 9 | 45 | kk, bi |
| Table 9 | 47 | kk, bi |
| Table 16 | 4 | on |
| Table 16 | 8 | off |
| Table 16 | 10 | off |
| Table 16 | 11 | on |
| Table 16 | 12 | on |
| Table 16 | 14 | off |
| Table 18 | 1 | bh |
| Table 18 | 2 | bh |

UNITED STATES PATENT AND TRADEMARK OFFICE

CERTIFICATE OF CORRECTION

PATENT NO. : 3,913,721
DATED : October 21, 1975
INVENTOR(S) : Harold Stanley Koplow et al.

It is certified that error appears in the above-identified patent and that said Letters Patent are hereby corrected as shown below:

The following letters and words appearing throughout the patent should appear in italic type:

| Column | Line | Word or Alphanumeric |
|---|---|---|
| Table 18 | 3 | bh |
| Table 18 | 5 | bh |
| Table 18 | 8 | bh |
| Table 18 | 9 | bh |
| Table 18 | 12 | bl |
| Table 18 | 13 | bl |
| Table 18 | 14 | bl |
| Table 18 | 15 | bl |
| Table 18 | 16 | bl |
| Table 18 | 18 | bh |
| Table 18 | 20 | bl |
| Table 18 | 23 | bad, bh |
| Table 18 | 25 | bl |
| 20 | 54-55 | same, adjust, justify, advance, skip, wait |
| 30 | 7 | s |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers, letters, words, or combinations of letters and words appearing throughout the patent should appear with quotation marks:

| Column | Line | Words or Numbers |
|---|---|---|
| 2 | 24 | Transfer |
| 2 | 61 | Transfer |
| 6 | 32 | Adjust |
| 7 | 63 | Transfer |
| 9 | 20 | 8, F |
| 11 | 11 | 3 |
| 11 | 12 | 0, 8 |
| 12 | 3 | f |
| 12 | 32 | Search |
| 15 | 3 | t |
| 16 | 2 | 0 |
| 16 | 3 | 1 |
| 16 | 64 | 7 |
| 16 | 67 | 7 |
| 18 | 53-54 | jump, address, high order, low order |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers, letters, words, or combinations of letters and words appearing throughout the patent should appear with quotation marks:

| Column | Line | Words or Numbers |
|---|---|---|
| 20 | 15 | 1 |
| 20 | 16 | 0 |
| 21 | 51 | 00 |
| 22 | 14 | 4241 |
| 22 | 27 | 6 |
| 22 | 64 | 1 |
| 23 | 15 | 9 |
| 23 | 21 | 5 |
| 23 | 33 | 2 |
| 23 | 37 | F |
| 23 | 38 | 2 |
| 23 | 44 | 0 |
| 23 | 45-46 | 3, 0, 1 |
| 23 | 59 | 2 |
| 23 | 60 | D |
| 23 | 61 | 0 |

CERTIFICATE OF CORRECTION

PATENT NO. : 3,913,721 Page 14 of 29

DATED : October 21, 1975

INVENTOR(S) : Harold Stanley Koplow et al.

It is certified that error appears in the above-identified patent and that said Letters Patent are hereby corrected as shown below:

The following numbers, letters, words, or combinations of letters and words appearing throughout the patent should appear with quotation marks:

| Column | Line | Words or Numbers |
|---|---|---|
| 24 | 26 | 6 |
| 24 | 27 | F, 9 |
| 24 | 39 | 0 |
| 24 | 40 | 0000 |
| 24 | 50 | 7 |
| 24 | 53 | CY5B |
| 24 | 58 | CY5B |
| 24 | 61 | 3 |
| 25 | 56 | 01 |
| 25 | 57 | 01 |
| 25 | 60 | 01 |
| 26 | 4 | 00 |
| 26 | 9 | 6 |
| 26 | 15 | 3 |
| 26 | 34 | 4 |
| 26 | 35 | 00 |

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers, letters, words, or combinations of letters and words appearing throughout the patent should appear with quotation marks:

| Column | Line | Words or Numbers |
|---|---|---|
| 26 | 43 | C (both occurrences) |
| 26 | 51 | 7 (both occurrences) |
| 27 | 12 | 01 |
| 27 | 15 | 01 |
| 27 | 18 | 01 |
| 27 | 39 | 1 |
| 27 | 53 | 02 |
| 27 | 55 | 02 |
| 28 | 4 | 01 |
| 28 | 29-30 | 6, 1, F |
| 28 | 36 | 0 |
| 28 | 41 | 3 |
| 28 | 48 | 1 |
| 29 | 2 | 02 |
| 29 | 3 | 01 |
| 29 | 4 | 00, 01 |
| 29 | 6 | 02 |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers, letters, words, or combinations of letters and words appearing throughout the patent should appear with quotation marks:

| Column | Line | Words or Numbers |
|---|---|---|
| 29 | 7 | 01 |
| 29 | 24 | 01 |
| 30 | 29 | 03 |
| 30 | 53 | Transfer |
| 31 | 17 | 0 |
| 31 | 20 | 0, 1 |
| 31 | 22 | 0 |
| 31 | 23 | 1 |
| 31 | 25 | 0 |
| 31 | 31 | 1 (both occurrences) |
| 32 | 12 | 0 (the first occurrence) |
| 32 | 13 | 1 (the first occurrence) |
| 32 | 36 | AA |
| 34 | 66 | PL |
| 38 | 19 | Same |
| 38 | 20 | Adjust, Justify |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers, letters, words, or combinations of letters and words appearing throughout the patent should appear with quotation marks:

| Column | Line | Words or Numbers |
|---|---|---|
| 38 | 21 | Same |
| 38 | 22 | NORD |
| 38 | 24 | NORD |
| 38 | 29 | NORD |
| 38 | 56 | NORD |

UNITED STATES PATENT AND TRADEMARK OFFICE

CERTIFICATE OF CORRECTION

PATENT NO. : 3,913,721
DATED : October 21, 1975
INVENTOR(S) : Harold Stanley Koplow et al.

It is certified that error appears in the above-identified patent and that said Letters Patent are hereby corrected as shown below:

The following numbers or combinations of letters and numbers throughout the patent should not appear in boldface type but appear with quotation marks:

| Column | Line | Word or Alphanumeric |
|---|---|---|
| 11 | 8 | 38 |
| 11 | 10 | 30 |
| 11 | 14 | 03 |
| 11 | 15 | 02 |
| 11 | 20 | 08 |
| 11 | 33 | 12 |
| 11 | 35 | 13 |
| 11 | 40 | 12 |
| 11 | 41 | 13 |
| 11 | 42 | 18 |
| 11 | 48 | 1A |
| 11 | 52 | 1B |
| 11 | 56 | 22 |
| 11 | 57 | 23 |
| 11 | 58 | 22 |

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers or combinations of letters and numbers throughout the patent should not appear in boldface type but appear with quotation marks:

| Column | Line | Word or Alphanumeric |
|---|---|---|
| 11 | 60 | 23 |
| 11 | 63 | 28 |
| 11 | 65 | 2A |
| 12 | 7 | 2B |
| 12 | 12 | 32 |
| 12 | 14 | 33 |
| 12 | 25 | 3A |
| 12 | 28 | 42 |
| 12 | 32 | 52 |
| 12 | 34 | 62 |
| 12 | 35 | 63 |
| 12 | 37 | 72 |
| 12 | 39 | 73 |
| 12 | 53 | 92 |
| 12 | 54 | A2 |
| 16 | 65 | 8 |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers or combinations of letters and numbers throughout the patent should not appear in boldface type but appear with quotation marks:

| Column | Line | Word or Alphanumeric |
|---|---|---|
| 22 | 62 | 11 |
| 22 | 66 | 11 |
| 23 | 1 | 11 |
| 23 | 65 | 11 |
| 24 | 12 | 11 |
| 25 | 6 | 11 |
| 25 | 21 | 11 |
| 25 | 55 | 11 |
| 25 | 64 | 11 |
| 27 | 15 | 11 |
| 27 | 37 | 11 |
| 27 | 53 | 11 |
| 28 | 2 | 13 |
| 28 | 21 | 13 |
| 29 | 21 | 80 |
| 29 | 38 | 80 |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following numbers or combinations of letters and numbers throughout the patent should not appear in boldface type but appear with quotation marks:

| Column | Line | Word or Alphanumeric |
|---|---|---|
| 29 | 56 | 11 |
| 29 | 58 | 51 |
| 30 | 11 | 51 |
| 30 | 12 | 11 |
| 30 | 24 | 33 |
| 30 | 38 | 33 |
| 31 | 50 | 33 |
| 38 | 12 | 33 |

UNITED STATES PATENT AND TRADEMARK OFFICE
CERTIFICATE OF CORRECTION

PATENT NO. : 3,913,721
DATED : October 21, 1975
INVENTOR(S) : Harold Stanley Koplow et al.

It is certified that error appears in the above-identified patent and that said Letters Patent are hereby corrected as shown below:

The following letters appearing throughout the patent should not appear in italic type but should appear with quotation marks:

| Column | Line | Letter |
|---|---|---|
| 16 | 63 | F |
| 16 | 65 | A, B, C, E, F |
| 17 | 40 | A |
| 17 | 50 | B |
| 17 | 59 | C |
| 18 | 2 | D, E |
| 18 | 4 | bi, kk |
| 18 | 53-54 | j, ad, h, l |
| 22 | 60 | s (both occurrences) |
| 22 | 62 | s |
| 23 | 1 | s |
| 27 | 37 | s |
| 29 | 58 | s |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following combinations of letters and numbers appearing throughout the patent should not appear in boldface type but should appear in italic type:

| Column | Line | Number |
|---|---|---|
| 11 | 9 | C9 |
| 12 | 24 | (9 |
| 12 | 26 | $4 |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

The following tabular material should appear with vertical alignment of the numbers as shown below:

Table 5

D1

| 3 | 2 | 1 | 0 | Switch | Function |
|---|---|---|---|---|---|
| | | | 0 | 18 | Select left |
| | | | 1 | 20 | Select right |
| | | 0 | | 34 | Single block recording |
| | | 1 | | 34 | Double block recording |
| 0 | 0 | | | 24 | Play |
| 0 | 1 | | | 26 | Record |
| 1 | 0 | | | 22 | Transfer |
| 1 | 1 | | | 27 | Edit |

D2

| 3 | 2 | 1 | 0 | Switch | Function |
|---|---|---|---|---|---|
| | | | 1 | 64 | Auto |
| | 1 | | | 56 | Paragraph |
| | 1 | | 1 | 58 | Line |
| | 1 | 1 | | 60 | Word |
| | 1 | 1 | 1 | 62 | Char/Stop |
| 1 | 1 | | | 70, 56 | Skip, Paragraph |
| 1 | 1 | | 1 | 70, 58 | Skip, Line |
| 1 | 1 | 1 | | 70, 60 | Skip, Word |
| 1 | 1 | 1 | 1 | 70, 62 | Skip, Character |

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

| | ai | bi | z9 | aop | ac | bc | mop | kk | st | sbr | jad | jh | jl |
|---|---|---|---|---|---|---|---|---|---|---|---|---|---|
| 4245: | 7 | 0 | 7 | 1 | 1 | 0 | 0 | 0 | 9 | 0 | 172 | 5 | 1 |

Column 1 line 43 "because" should be --becomes--

Column 1 line 54 after "all" insert --the--

Column 2 line 13 "tape decreases" should be --tapes decrease--

Column 3 line 6 "conected" should be --connected--

Column 5 line 10 after "12" delete "15" and insert --show--

Column 5 line 11 "5" should be --15--

Column 6 line 7 "in" should be --is--

Column 7 line 38 after "and" insert --either--

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

Table 2 line 1 "*00 x" should be --*00 ---

Table 2 line 5 "*04 a" should be --*04 q--

Table 2 line 11 "OA (EOD) End of Document" should be --0A (EOD) End of Document--

Table 2 line 12 "OB Stop" should be --0B Stop--

Table 2 line 13 "*OC ," should be --*0C ,--

Table 2 line 14 "*OD ;" should be --*0D ;--

Table 2 line 15 "*OE f" should be --*0E f--

Table 2 line 16 "*OF g" should be --*0F g--, "*3F 1" should be --*3F ]--

Table 2 line 17 "*10 W" should be --*10 w--

Table 2 line 30 "40 ,(u)" should be --4C ,(u)--

UNITED STATES PATENT AND TRADEMARK OFFICE

CERTIFICATE OF CORRECTION

PATENT NO. : 3,913,721 Page 27 of 29

DATED : October 21, 1975

INVENTOR(S) : Harold Stanley Koplow et al.

It is certified that error appears in the above-identified patent and that said Letters Patent are hereby corrected as shown below:

Table 2 line 39 "*25 c" should be --*25 e-- "55 '(u)" should be --55 '(u)--

Table 2 line 51 "61 b(u)" should be --61 h(u)--

Table 2 line 91 "*89" should be --*89 ?--

Table 2 line 94 "*8S :" should be --*8D :--

Table 2 line 107 "C9 (u)" should be --C9 ?(u)--

Column 11 line 26 "OA" should be --0A--

Column 11 line 29 "OB" should be --0B--

Column 11 line 67 ""earn"" should be --"earn ("--

Column 12 line 53 "clear tabe" should be --clear tab-- and in italics

Column 13 line 28 "appln." should be --Appln.--

UNITED STATES PATENT AND TRADEMARK OFFICE

CERTIFICATE OF CORRECTION

PATENT NO. : 3,913,721

DATED : October 21, 1975

INVENTOR(S) : Harold Stanley Koplow et al.

It is certified that error appears in the above-identified patent and that said Letters Patent are hereby corrected as shown below:

Column 19 line 53 "FIg." should be --FIG.--

Column 21 line 18 "Byte" should be --Bytes--

Column 22 line 7 "Two" should be --The--

Column 22 line 51 "ss" should be --s<u>s</u>--

Column 23 line 20 "not" should be --now--

Column 24 line 49 "opepation" should be --operation--

Column 25 line 14 "4283." should be --4283:--

Column 25 line 26 "Words" should be --word--

Column 25 line 35 "return" should be --return.--

Column 25 line 57 "incremental" should be --incremented--

Column 26 line 9 "contents" should be --content--

UNITED STATES PATENT AND TRADEMARK OFFICE

CERTIFICATE OF CORRECTION

PATENT NO. : 3,913,721 Page 29 of 29

DATED : October 21, 1975

INVENTOR(S) : Harold Stanley Koplow et al.

It is certified that error appears in the above-identified patent and that said Letters Patent are hereby corrected as shown below:

Column 27 line 14 "incremental" should be --incremented--

Column 28 line 32 "ODC" should be --0DC--

Column 30 line 18 "ss" should be --s<u>s</u>--

Column 30 line 26 "DO" should be --D0--

Column 30 line 43 "ss" should be --s<u>s</u>--

Column 32 line 29 "msed" should be --msec--

Column 36 line 10 "bo" should be --be--

Column 39 line 4 "proceded" should be --preceded--

Column 40 line 5 "reads" should be --read--

Column 42 line 47-48 "records" should be --record--

Signed and Sealed this

*Fifth* Day of *August 1980*

[SEAL]

*Attest:*

SIDNEY A. DIAMOND

*Attesting Officer* *Commissioner of Patents and Trademarks*